United States Patent
Nomoto

(10) Patent No.: US 8,788,799 B2
(45) Date of Patent: *Jul. 22, 2014

(54) SERVER COMPUTER, COMPUTER SYSTEM, AND FILE MANAGEMENT METHOD

(75) Inventor: Toyohiro Nomoto, Yokohama (JP)

(73) Assignee: Hitachi, Ltd., Tokyo (JP)

(*) Notice: Subject to any disclaimer, the term of this patent is extended or adjusted under 35 U.S.C. 154(b) by 111 days.

This patent is subject to a terminal disclaimer.

(21) Appl. No.: 13/557,354

(22) Filed: Jul. 25, 2012

(65) Prior Publication Data

US 2012/0290579 A1  Nov. 15, 2012

Related U.S. Application Data

(63) Continuation of application No. 12/216,587, filed on Jul. 8, 2008, now Pat. No. 8,275,980.

(30) Foreign Application Priority Data

May 11, 2008 (JP) ................................. 2008-125284

(51) Int. Cl.
*G06F 17/30* (2006.01)
*G06F 3/06* (2006.01)

(52) U.S. Cl.
CPC ........ *G06F 17/30067* (2013.01); *G06F 3/0641* (2013.01)
USPC .......................................................... 713/1

(58) Field of Classification Search
CPC ............. G06F 3/0641; G06F 11/1453; G06F 11/1435; G06F 17/30156; G06F 17/30067; G06F 9/00; G06F 9/24; G06F 15/177; G06F 13/00; G06F 13/28; G06F 17/30
USPC .................................................. 713/1, 2, 100
See application file for complete search history.

(56) References Cited

U.S. PATENT DOCUMENTS 7,324,749 B2  1/2008  Kubo (Continued)

FOREIGN PATENT DOCUMENTS

JP  10-510642 A  10/1998
WO  WO 96/18960 A1  6/1996

OTHER PUBLICATIONS

Technical report: NetApp Deduplication for FAS Deployment and Implementation Guide, 4th Revision, Apr. 16, 2008, pp. i-iii and 1-24.

(Continued)

*Primary Examiner* — Thomas Lee
*Assistant Examiner* — Danny Chan
(74) *Attorney, Agent, or Firm* — Nicholas Trenkle, Esq.; Stites & Harbison, PLLC

(57) ABSTRACT

A server computer which determines the configuration of a file for configuring a plurality of virtual computers respectively is configured to comprise: an OS/AP file evaluation criteria table which stores evaluation criteria for judging whether to split and manage a file required for the configuration of the virtual computers; a user data evaluation criteria TBL; and a verification and splitting unit which judges whether the file conforms to the evaluation criteria, and determines a part of a file judged to conform to the evaluation criteria as a first file stored as an entity and determines the remaining part of the file as a second file for referencing an entity of a predetermined destination storage.

6 Claims, 15 Drawing Sheets

(56) References Cited

U.S. PATENT DOCUMENTS

| | | | |
|---|---|---|---|
| 8,190,835 B1* | 5/2012 | Yueh | 711/162 |
| 2003/0009725 A1 | 1/2003 | Reichenbach | |
| 2005/0216694 A1* | 9/2005 | Cohen et al. | 711/173 |
| 2007/0294676 A1 | 12/2007 | Mellor et al. | |

OTHER PUBLICATIONS

Office Action, issued from the Japanese Patent Office, in corresponding Japanese Patent Application No. 2008-125284, dated Jun. 19, 2012, pp. 1-4.

* cited by examiner

FIG. 3

| # | EVALUATION CRITERIA | PROCESSING | |
|---|---|---|---|
| 1 | WITHOUT READ/WRITE ACCESS | REFERENCE | 311 |
| 2 | WITH READ ACCESS, WITHOUT WRITE ACCESS | REFERENCE* | 312 |
| 3 | WITH READ ACCESS, WITH WRITE ACCESS | ENTITY | 313 |
| 4 | WITHOUT READ ACCESS, WITH WRITE ACCESS | ENTITY | 314 |
| 5 | READ ACCESS FREQUENCY > REFERENCE VALUE | ENTITY* | 315 |
| 6 | LOCALIZED WRITE ACCESS | SPLIT | 316 |
| 7 | OS USER DATA OR APPLICATION DATA | SPLIT* | 317 |
| 8 | OS NON-USER DATA | REFERENCE | 318 |
| 9 | DATA AMOUNT < REFERENCE VALUE | ENTITY | 319 |

FIG. 4

| # | EVALUATION CRITERIA | PROCESSING | |
|---|---|---|---|
| 1 | DESIGNATED AS CUSTOMIZABLE FIELD | ENTITY | 411 |
| 2 | DESIGNATED AS FIXED VALUE FIELD | REFERENCE | 412 |
| 3 | DATA MODEL ANNOTATIONS= MASTER DATA, REFERENCE, ETC | REFERENCE | 413 |
| 4 | DATA MODEL ANNOTATIONS= USER DATA, ENTITY, ETC | ENTITY | 414 |
| 5 | LOOKUP ONLY; NO UPDATE/INSERT | REFERENCE* | 415 |
| 6 | JOIN PROCESSING HAS BEEN PERFORMED BUT NO UPDATE/INSERT | REFERENCE* | 416 |
| 7 | UPDATE/INSERT FIELD LOCALITY (SPECIFIED FIELD VALUE IS VALUE FROM ANOTHER TABLE AND CAN BE NORMALIZED) | SPLIT* | 417 |
| 8 | CAN BE NORMALIZED | SPLIT* | 418 |
| 9 | ACCESS FREQUENCY > REFERENCE VALUE | ENTITY | 419 |
| 10 | DATA AMOUNT < REFERENCE VALUE | ENTITY | 420 |

FIG. 8

BEFORE SPLIT

851 — Update Table1 Set Qty=xx where id= aa factory = bb

| # | DataField | PROCESSING | KEY VALUE | |
|---|---|---|---|---|
| 1 | ID | Select | true | ~811 |
| 2 | Qty | Update | | ~812 |
| 3 | Factory | Select | | ~813 |
| 4 | Product Color | Select | | ~814 |
| 5 | Description CLOB | Select | | ~815 |

810 points to the table; 801 DataField, 802 PROCESSING, 803 KEY VALUE, 804

AFTER SPLIT

852 — Update Table1 Set Qty = xx where id.Table1 == id.Table2 ==aa AND Factory.Table2 == bb

820

| # | DataField | PROCESSING |
|---|---|---|
| 1 | ID | Select |
| 2 | Qty | Update |

830

| # | DataField | PROCESSING |
|---|---|---|
| 1 | ID | Select |
| 3 | Factory | Select |
| 4 | Product Color | Select |
| 5 | Description CLOB | Select |

FIG. 16

| # | FILE SOURCE 1602 | FILE DESTINATION 1603 | CLASSIFICATION FIELD 1604 | SPLIT FIELD 1605 | VALIDITY FIELD 1606 |
|---|---|---|---|---|---|
| 1 | TEMPLATE 1:/usr/bin | USER*:/usr/bin | REFERENCE | NONE | VALID | 1611 |
| 2 | TEMPLATE 1:/home/root | USER*:/home/root | ENTITY | PRE-SPLIT | INVALID | 1612 |
| 3 | TEMPLATE 1:/home/root/b.sh | USER*:/home/root/b.sh | ENTITY | NONE | VALID | 1613 |
| 4 | TEMPLATE 1:/home/root1 | USER*:/home/root1 | ENTITY | POST-SPLIT | VALID | 1614 |
| 5 | TEMPLATE 1:/home/root2 | USER*:/home/root2 | REFERENCE | POST-SPLIT | VALID | 1615 |
| 6 | TEMPLATE 1:/home/root/c.sh | USER*:/home/root/c.sh | REFERENCE | NONE | INVALID | 1616 |
| 7 | File001 | File001 | REFERENCE | PRE-SPLIT | INVALID | 1617 |
| 8 | File001 | File001 | REFERENCE | POST-SPLIT | VALID | 1618 |
| 9 | File002 | File002 | ENTITY | POST-SPLIT | VALID | 1619 |
| 10 | user1 | user1 | ENTITY | PRE-SPLIT | INVALID | 1620 |
| 11 | user1 | User1 | ENTITY | POST-SPLIT | VALID | 1621 |
| 12 | ref1 | ref1 | REFERENCE | POST-SPLIT | VALID | 1622 |
| 13 | /opt/DBMS/Table810 | opt/DBMS/Table810 | ENTITY | PRE-SPLIT | INVALID | 1623 |
| 14 | /opt/DBMS/Table820 | /opt/DBMS/Table820 | ENTITY | POST-SPLIT | VALID | 1624 |
| 15 | /opt/DBMS/Table830 | /opt/DBMS/Table830 | REFERENCE | POST-SPLIT | VALID | 1625 |
| 16 | /opt/DBMS/osfiles | /opt/DBMS/osfiles | REFERENCE | NONE | VALID | 1626 |
| 17 | /home/root/c.sh | /home/root/c.sh | REFERENCE | NONE | VALID | 1627 |

FIG. 17

| # | ACCESS | ACCESS TYPE | ADDRESS | FREQUENCY | DATA AMOUNT | |
|---|---|---|---|---|---|---|
| 1 | /usr/bin | Read | AA00-BB00/AA00-CC00 | 50 | 100 | —1711 |
| 2 | /home/root/ | Read/Write | CC00-CC0A/CC00-DD00 | 100 | 100 | —1712 |
| 3 | /home/root/b.sh | Read | EE00-EF00/EE00-EF00 | 500 | 50 | —1713 |

| # | FILE NAME | CLASSIFICATION | |
|---|---|---|---|
| 1 | /opt/DBMS/osfiles | OS NON-USER | —1811 |
| 2 | /home/root/c.sh (ONLY REFERENCE) | USER | —1812 |
| 3 | /opt/DBMS/* | AP | —1813 |

| # | FILE NAME | CLASSIFICATION | REMARKS | |
|---|---|---|---|---|
| 1 | /usr/bin/ | OS | | —1911 |
| 2 | /home/root/b.sh | USER | | —1912 |
| 3 | /opt/DBMS/dbusersettings | AP | | —1913 |

SERVER COMPUTER, COMPUTER SYSTEM, AND FILE MANAGEMENT METHOD

CROSS-REFERENCE TO PRIOR APPLICATION

This application is a Continuation of U.S. application Ser. No. 12/216,587 filed on Jul. 8, 2008. Priority is claimed based on U.S. application Ser. No. 12/216,587 filed on Jul. 8, 2008, which claims priority from Japanese Patent Application number 2008-125284, filed on May 12, 2008, the entire disclosure of which is incorporated herein by reference.

BACKGROUND

In a system that provides software such as 'Software as a Service' as a multi-tenant-type service, the same software is customized for each user and the user is provided with this software together with the computer power to execute the software. A system of this kind permits the provision of services for a user whereby computer resources are utilized effectively by virtualizing a computer and storage for providing the computer power.

In a system of this kind, a technology (first technology) for providing a virtual computer for multi-tenant users as one template is known. However, with this technology, there is the problem that the storage use efficiency is poor because of the overlap between the storage areas of the storage used by the common OS and applications (AP).

In contrast, there are also technologies for activating and using an OS or application environment from a common disk image by means of a network boot which utilize Apple's NetBoot or Intel's PXE standards, or the like. However, although these technologies permit low-level configuration modifications such as network address modifications (such as DHCP or Active Directory modifications, for example), there is the problem that it is not possible to deal with either a detailed customization for each end user or differences in configuration or, when the latter can be dealt with, different disk images are required and storage use efficiency is poor.

In addition, in contrast, a technology (second technology) for eliminating file redundancy by using Symantec's VMAS to scan files among virtual computer files and substituting redundant files so that one file is referenced, thereby raising the use efficiency of the storage areas of the storage, is known. However, because a scan must be performed on disk images deployed individually for each virtual computer, there is the problem that the processing load when performing the scanning is high.

Further, because the units of substitution for referencing are file units, in cases where files of a large size such as DBMS files are included in virtual computer files, there is the problem that, even if there were a multiplicity of common data parts in the files, the multiplicity of common data parts lie beyond the scope of the redundancy elimination target and efficient usage of the storage is difficult to achieve. In addition, in cases where software is customized, because the modified content sometimes also relates to common part files, attention is required when modifying the common part files, in other words, there is the problem that modifications cannot be made without care.

On the other hand, if only SI (single instanced) parts are modified when a template is modified, the results are reflected in each virtual computer. However, modification of the common points of the user data parts must be dealt with individually. Moreover, in order to increase the use efficiency of the storage, a scan must be performed and redundancy must be eliminated after dealing with individual modifications.

Furthermore, a technology (third technology) which uses NetApp A-SIS to implement block-level redundancy elimination for the whole file system has been employed. Accordingly, needs for storage use efficiency are met because redundancy elimination can be carried out if blocks have the same at bit level (See NetApp's Technical Report: NetApp A-SIS Deduplication Deployment and Implementation Guide, for example). However, there is the problem that, because this technology is applied to the whole file system, a plurality of separation levels cannot be set and it is not possible to cater to detailed service levels. In addition, where configuration modifications and template updates are concerned, there is the problem that the amount of disk usage increases in cases where individual modifications are carried out. Furthermore, in cases where modifications of the template are reflected, the impact and risk of such modifications when same are made simply at block level are unpredictable in their scope.

As described above, conventional technologies are confronted by a variety of problems. In other words, because the same template is used by the first technology, there is the problem that customizable parts are limited. In addition, with the second technology, in cases where a huge single file exists in which only a small number of parts are different and the remaining parts are common parts, the file cannot be a redundancy elimination target and the efficient capacity savings cannot be implemented. Furthermore, with the third technology, it is difficult to execute efficient update work in a form where shared files are replaced in order to implement single instancing at block level.

SUMMARY

It is therefore an object of the present invention to provide a technology which enables more effective redundancy elimination for files which configure a plurality of virtual computers.

In order to achieve this object, the server computer according to an aspect of the present invention is a server computer which determines the configuration of a file for configuring a plurality of virtual computers respectively, comprising a file splitting evaluation criteria storage unit which stores evaluation criteria for judging whether to split and manage a file required for the configuration of the virtual computers; a judgment unit which judges whether the file conforms to the evaluation criteria; and a determination unit which determines a part of the file judged to conform to the evaluation criteria as at least one first file stored as an entity and determines the remaining part of the file as at least one second file for referencing an entity of a predetermined destination storage.

BRIEF DESCRIPTION OF THE DRAWINGS

FIG. 3 shows an example of an OS/AP file evaluation criteria table according to an embodiment of the present invention;

FIG. 4 shows an example of a user data evaluation criteria table according to an embodiment of the present invention;

FIG. 8 provides a third view illustrating application data model processing logic and splitting thereof according to an embodiment of the present invention;

FIG. 16 shows an example of a mapping table according to an embodiment of the present invention;

FIG. 17 shows an example of a trace data table according to an embodiment of the present invention;

FIG. 18 shows an example of a file list table according to an embodiment of the present invention; and FIG. 19 shows an example of an update file list table according to an embodiment of the present invention.

DESCRIPTION OF THE PREFERRED EMBODIMENTS

An embodiment of the present invention will be described with reference to the drawings. The embodiment illustrated hereinbelow does not limit inventions falling within the scope of the claims, nor are the various elements described in the embodiment as well as all combinations thereof necessarily required by the means for solving the invention.

Figure 1:
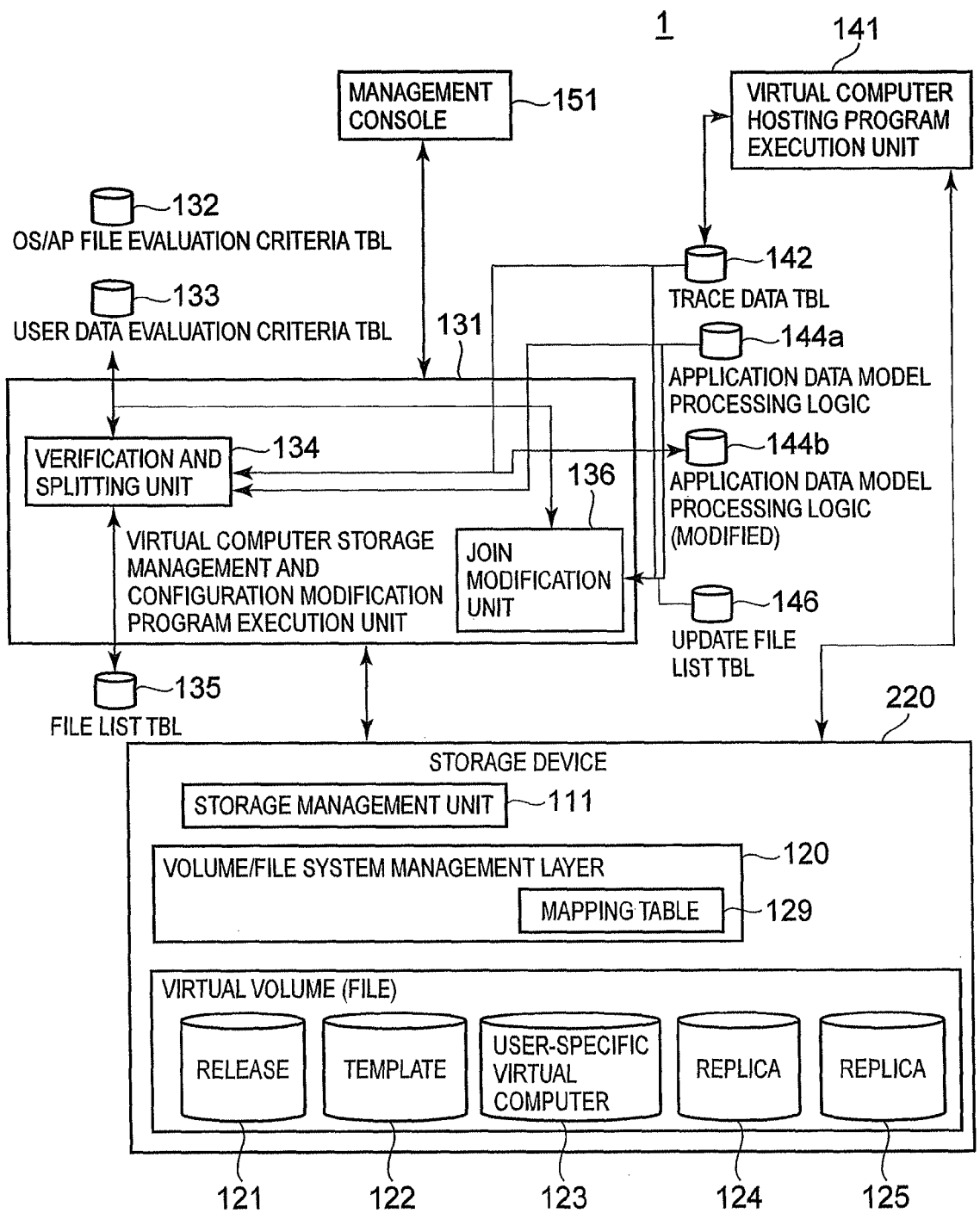
FIG. 1 is a functional configuration view of a computer system according to an embodiment of the present invention.

FIG. 1 is a functional configuration view of the computer system according to an embodiment of the present invention.

In a computer system 1, a management console 151 issues an instruction to a virtual computer storage management and configuration modification program execution unit 131 and a virtual computer hosting program execution unit 141. The virtual computer storage management and configuration modification program execution unit 131 executes verification and splitting processing for performing redundancy elimination in a virtual computer volume image and update processing to update files in the virtual computer volume image by executing a virtual computer storage management and configuration modification program 130 (See FIG. 2). The virtual computer hosting program execution unit 141 is an example of a virtual computer execution unit and trace data output unit and executes a virtual computer operation by executing a virtual computer hosting program 140 (See FIG. 2).

A storage device 220 holds a storage management unit 111, a volume file system management layer 120, a virtual computer volume image (release virtual computer volume image) 121 which is the release version of the virtual computer, a virtual computer volume image (template virtual computer volume image) 122 which is the template of the virtual computer provided for each user, a virtual computer volume image (user-specific virtual computer volume image) 123 which is the version provided for each user, and replica virtual computer volume images (replica images) 124 and 125 which are copies (replicas) of the virtual computer volume image created as required. The number of volume images 121 to 125 may also be an arbitrary number. The volume file system management layer 120 holds a mapping table 129. The mapping table 129 stores the correspondence between the virtual computer volume images 121 to 125 and the files contained therein and/or the correspondence between the virtual computer volume images 121 to 125 and physical volumes.

At the time of its initial release, the virtual computer hosting program execution unit 141 reads the release virtual computer volume image 121 of the storage device 220, executes an operation as a virtual computer by means of the virtual computer volume image, and outputs the execution status of the virtual computer to a trace data table 142 as trace data.

The virtual computer storage management and configuration modification program execution unit 131 comprises a verification and splitting unit 134, which is an example of a judgment unit, a determination unit, a setting unit, a handling information acquisition unit, and a modified handling information storage unit, and comprises a join modification unit 136, which is an example of a reception unit, a joining unit, and a replacement unit. At the time of its initial release, the verification and splitting unit 134 reads an OS/AP file evaluation criteria table 132, a user data evaluation criteria table 133, the trace data table 142, an application data model processing logic 144a, the mapping table 129, the release virtual computer volume image 121, performs processing such as file splitting, generates the template virtual computer volume image 122, revises the mapping table 129, and outputs an application data model processing logic (modified) 144b.

Thereafter, the verification and splitting unit 134 generates and outputs a user-specific virtual computer volume image 123 based on the mapping table 129 and the template virtual computer volume image 122 in accordance with each user. Thereafter, the virtual computer hosting program execution unit 141 reads the user-specific virtual computer volume image 123, and, by executing an operation as a virtual computer, provides predetermined services for the user of a client computer 210. In this embodiment, the application data model processing logic (modified) 144b is disposed in the virtual computer volume image 123, for example, but may also be disposed elsewhere.

The join modification unit 136 creates a replica virtual computer volume image 124 which is a replica of the user-specific virtual computer volume image 123, reads the replica virtual computer volume image 124, the template virtual computer volume image 122, the application data model processing logic 144b, and the mapping table 129. In cases where a file to be updated has been split, the join modification unit 136 joins the split files by means of the template virtual computer volume image 122 and replica volume image 124. The join modification unit 136 executes file update processing. After executing the file update processing, in cases where the file is joined, the verification and splitting unit 134 carries out processing to create the user-specific virtual computer volume image 123. The virtual computer volume image which is inputted to the verification and splitting unit 134 is not the same volume image at the time of the initial release, but the replica virtual computer volume image 124 which is the processing target of the join modification unit 136.

Here, in cases where file joining is not required, the virtual computer hosting program execution unit 141 confirms the operation by reading the replica virtual computer volume image 124 established in the update processing and changes the replica virtual computer volume image 124 to the user-specific virtual computer volume image 123 for providing services for the user. As a result, services can be suitably provided for the user following the update. The user-specific virtual computer volume image 123 is provided for each user supplied with a virtual computer in this embodiment but the embodiment is not limited to this arrangement. The user-specific virtual computer volume image 123 may also be shared by a plurality of users and a virtual configuration is possible.

In the above configuration, the OS/AP file evaluation criteria table 132, the user data evaluation criteria table 133, the trace data table 142, the application data model processing logic 144a, and the application data model processing logic (modified) 144b may also be stored in arbitrary storage areas so long as they are storage areas which can be accessed by functional units which utilize the tables and logics respectively. In addition, the volume image configuring the virtual computer may also be disposed in a file system or disposed in a physical volume of the storage device 220 which uses the virtualization mechanism. In addition, some of the constituent elements shown in FIG. 1 may also be implemented by dedicated hardware.

Figure 2:
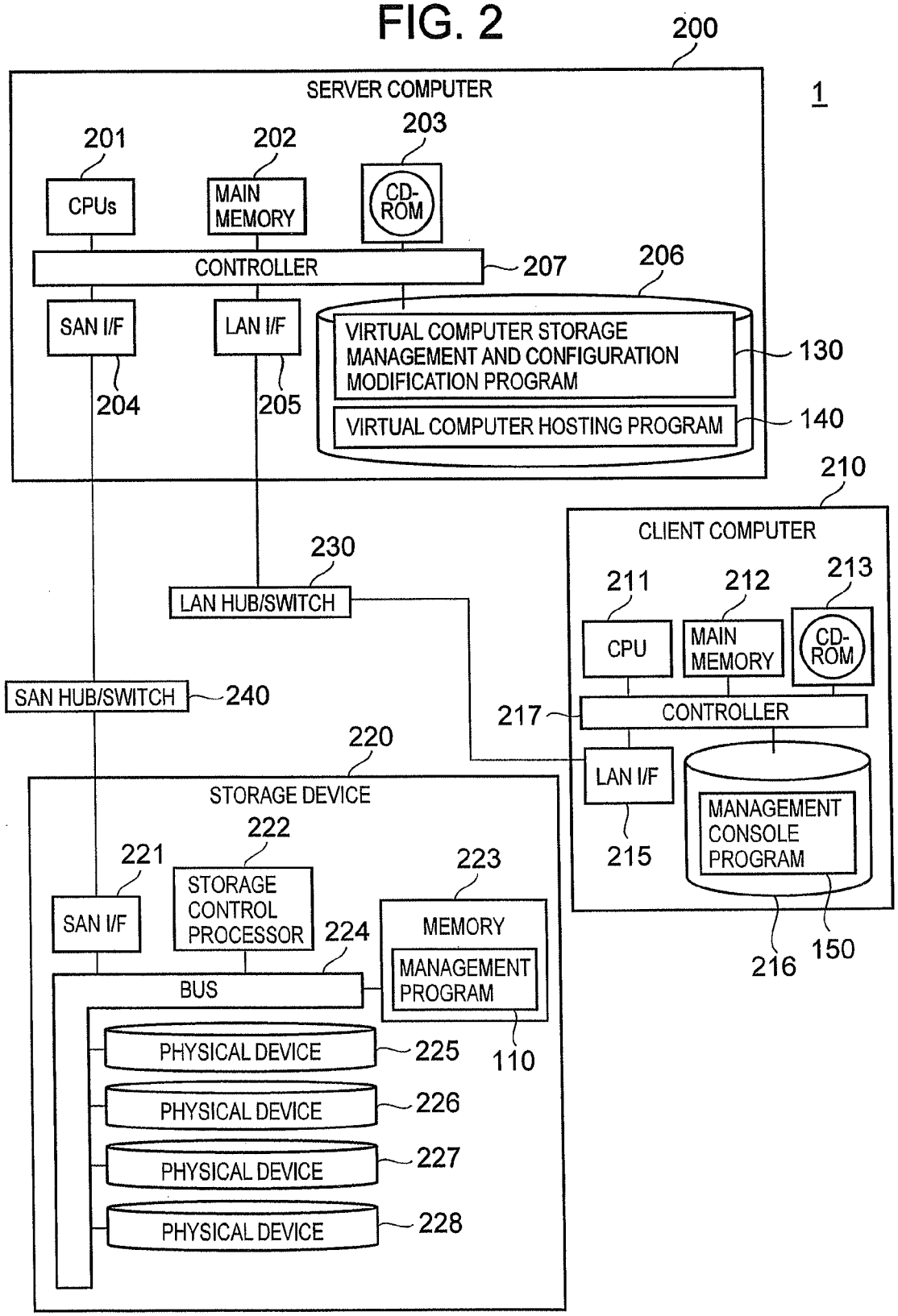
FIG. 2 is a hardware configuration view of the computer system according to an embodiment of the present invention.

FIG. 2 is a hardware configuration view of the computer system according to an embodiment of the present invention.

The computer system 1 comprises a server computer 200, the client computer 210, and the storage device 220.

The server computer 200 and client computer 210 are connected to one another via a LAN (Local Area Network) hub (or switch) 230 and cable. Here, the LAN hub 230 and network are sometimes also collectively referred to as the LAN. Furthermore, the network connecting the server computer 200 and client computer 210 need not be a LAN.

The server computer 200 and storage device 220 are connected to one another via a SAN (Storage Area Network) hub (or switch) 240 and cable. Here, the SAN hub 240 and network are sometimes also collectively referred to as the SAN. The network connecting the server computer 200 and the storage device 240 need not be a SAN.

The server computer 200 is a computer which executes the virtual computer storage management and configuration modification program 130 and the virtual computer hosting program 140. The server computer 200 comprises a CPU group (CPUs) 201, a main memory 202, a CD-ROM device 203, a SAN I/F 204, a LAN I/F 205, and a disk device 206. Each of these parts 201 to 206 are connected to one another by a controller 207.

The disk device 206 stores programs such as the virtual computer storage management and configuration modification program 130 and the virtual computer hosting program 140 as well as data of the trace data table 142, application data model processing logic 144a, application data model processing logic 144b, and an update file list table 146. The CPUs 201 loads these programs into the main memory 202 and executes the programs. The virtual computer storage management and configuration modification program execution unit 131 is configured as a result of CPUs 201 executing the virtual computer storage management and configuration modification program 130 and the virtual computer hosting program execution unit 141 is configured as a result of the CPUs 201 executing the virtual computer hosting program 140.

At least a portion of the programs and data stored in the disk device 206 may also be stored in the disk device 216 of the client computer 210, may be stored in the virtual volume images 121 to 123 of the storage device 220, or may be stored in the physical devices 225 to 228 of the storage device 220.

The client computer 210 is a computer which serves to allow the computer system administrator to perform management work and update work on the virtual computers provided by the server computer 200, place the virtual computers in the server computer 200, and run the virtual computers. The client computer 210 comprises a CPU 211, a main memory 212, a CD-ROM device 213, a LAN I/F 215, a disk device 216, and a controller 217 which connects each of these parts to one another.

The disk device 216 of the client computer 210 stores a management console program 150. The CPU 211 loads these programs into the main memory 212 and executes the programs. The management console 151 is configured as a result of the CPU 211 executing the management console program 150. The computer system administrator is able to perform execution management of the virtual computer storage management and configuration modification program execution unit 131 and virtual computer hosting program execution unit 141 by means of the management console 151. At least a portion of the programs and data and so forth stored in the disk device 216 may also be stored in the disk device 206 of the server computer 200 and may be stored in the physical devices 225 to 228 of the storage device 220.

In this embodiment, the computer system 1 is configured to comprise the server computer 200, client computer 210, and storage device 220 configured as separate devices but is not limited to such a configuration. The computer system 1 may also be configured as a single device (computer and storage device) with the required configuration or there may be a plurality of at least anyone device among the server computer 200, client computer 210, and storage device 220.

The storage device 220 comprises a SAN I/F 221, a storage control processor 222, a memory 223, and physical devices 225 to 228. These parts are each connected to one another by a bus 224. The management program 110 is loaded into the memory 223 and, as a result of the management program 110 being executed by the storage control processor 222, a storage management unit 111 and volume/file system management layer 120 are configured and control of the volume/file system management layer 120 is executed. Here, the release virtual computer volume image 121, template virtual computer volume image 122, user-specific virtual computer volume image 123, replica volume image 124, and replica volume image 125 are stored in at least some storage areas of at least one physical device of the physical devices 225 to 228, for example.

An outline of the flow of the processing of the computer system according to this embodiment will be provided next.

First, the computer system administrator executes a test execution by using a virtual computer which is configured by the virtual computer hosting program execution unit 141 by using the release virtual computer volume image 121 by issuing an instruction to the management console 151 configured by the client computer 210. Here, the virtual computer hosting program execution unit 141 outputs trace data 142. Following the test execution, the computer system administrator uses the management console 151 to issue a request to execute the verification and splitting unit 134 to the virtual computer storage management and configuration modification program execution unit 131. The verification and splitting unit 134 reads the release virtual computer volume image 121 and also reads various data from the trace data table 142, the OS/AP file evaluation criteria table 132, the user data evaluation criteria table 133, the application data model processing logic 144a, and the mapping table 129.

The verification and splitting unit 134 judges whether a corresponding file can serve as a reference to the entity of a file of a predetermined storage area by judging whether each file is shareable (in the same way regardless of the user) or whether access to the file is different for each user, in accordance with the status of the access to the file on the virtual computer volume image contained in the trace data of the trace data table 142, carries out work to mark a file for referencing or mark a file as an entity according to the judgment results, and updates the mapping table 129.

In addition, the verification and splitting unit 134 judges whether each file can be split into a shareable part in the file and a part which is different for each user (non-shareable part), on the basis of the evaluation criteria stored in the OS/AP file evaluation criteria table 132 and user data evaluation criteria table 133. Furthermore, in cases where it is judged that a file can be split, the verification and splitting unit 134 splits the corresponding file into a shareable part file (second file) and a file of a part which is different for each user (first file) and, for the file containing the shareable part, updates the mapping table 129 with respect to referencing predetermined files and updates the mapping table 129 by rendering files of parts which are different for each user entities. The verification and splitting unit 134 also rewrites the application data model processing logic 144a in accordance with the file splitting, outputs same as the application data model processing logic (modified) 144b, and outputs the template virtual computer volume image 122 which is the template provided for each user.

In cases where a virtual computer is provided for each user, the virtual computer storage management and configuration modification program execution unit 131 generates a user-specific virtual computer volume image 123 on the basis of the template virtual computer volume image 122 which is the template and the virtual computer hosting program execution unit 141 uses the user-specific virtual computer volume image 123 to configure and execute a virtual computer and provides the user with the virtual computer. Here, the virtual computer storage management and configuration modification program execution unit 131 generates a user-specific virtual computer volume image 123 so that a reference file references the entity of the file in the template virtual computer volume image 122, on the basis of the mapping table 129.

The splitting of a file in the virtual computer volume image is carried out as pre-processing by executing the above processing and, by executing file redundancy elimination, the capacity of the materialized files in the user-specific virtual computer volume image 123 can be reduced and the required disk capacity can be reduced.

Next, when the computer system administrator uses the management console 151 to issue instructions in update work to update a file for configuring a virtual computer, the join modification unit 136 creates a replica virtual computer volume image 124 which is a replica of the user-specific virtual computer volume image 123 and creates a replica virtual computer volume 125 which is a replica of the template virtual computer volume image 121. In addition, the join modification unit 136 reads the replica virtual computer volume images 124 and 125, the application data model processing logic 144b, and the update file list table 146 and mapping table 129.

The join modification unit 136 replaces the target files with updated files (update files) in cases where the update of the files of the replica virtual computer volume images 124 and 125 is a simple replacement in accordance with the contents of the update file list table 146. In addition, in cases where the file update is not completed with a simple replacement, the join modification unit 136 joins the files or the like split by the verification and splitting unit 134 and executes update processing with respect to the joined and materialized replica virtual computer volume image 124, and the verification and splitting unit 134 executes the splitting processing once again after the update processing.

Following the update processing, the virtual computer hosting program execution unit 141 carries out an operation confirmation by using the replica virtual computer volume image 124 thus created to configure a virtual computer. Thereafter, the virtual computer hosting program execution unit 141 renders the updated replica virtual computer volume image 124 the user-specific virtual computer volume image 123 and renders the updated replica virtual computer volume image 125 the template virtual computer volume image 122 to configure and execute a virtual computer and provides the user with the virtual computer.

FIG. 3 shows an example of the OS/AP file evaluation criteria table according to an embodiment of the present invention.

The OS/AP file evaluation criteria table 132 stores evaluation criteria for classifying files for the execution of any of splitting processing, reference processing, or materialization processing. The OS/AP file evaluation criteria table 132 stores records which have an ID field 301, an evaluation criteria field 302, and a processing content field 303. The ID field 301 stores the IDs (record numbers, for example) of the records. The evaluation criteria field 302 stores evaluation criteria. The processing content field 303 stores the processing content for handling files in cases where the corresponding evaluation criteria are satisfied. The OS/AP file evaluation criteria table 132 is not limited to the above fields and may also contain fields describing information relating to the evaluation criteria and numerical values for the evaluation, and so forth. Furthermore, the OS/AP file evaluation criteria table 132 is configured with one record for each evaluation criterion but is not limited to one record for each evaluation criterion. Rather, the OS/AP file evaluation criteria table 132 may also place items collected from different standpoints to include similar content in a single record.

Record 311 shows that the evaluation criterion is that the file should be a file 'without Read/Write access' and that, in cases where the file meets evaluation criterion, the file is rendered a 'reference' and not materialized. Record 312 shows that the evaluation criterion is that the file should be a file with 'Read access but no Write access' and that, in cases where the file meets the evaluation criterion, the file is rendered a 'conditional reference' and not materialized. Record 313 shows that the evaluation criterion is that the file should be a file with 'both Read access and Write access' and that, in cases where the file meets the evaluation criterion, the file is rendered an 'entity' and materialized.

Record 314 shows that the evaluation criterion is that the file should be a file 'without Read access and with Write access' and that, in cases where the file meets the evaluation criterion, the file is rendered an 'entity' and materialized. Record 315 shows that the evaluation criterion is that the file should be a file for which 'the Read access frequency exceeds an established reference value' and that, in cases where the evaluation criterion is met, the file is rendered a 'conditional entity' and materialized. Record 316 shows that the evaluation criterion is that the file should be a file for which 'localized Write access exists' and that, in cases where the file meets the evaluation criterion, the file is rendered a 'split' file and the file is split.

Record 317 shows that the evaluation criterion is that the file should be an 'OS user data or application data' file, and that, in cases where the evaluation criterion is met, the file is rendered a 'conditional split' file and the file is split. Record 318 shows that the evaluation criterion is that the file should be an 'OS non-user data' file, and that, in cases where the evaluation criterion is met, the file is rendered a 'conditional reference' file and the file is rendered a reference and not materialized. Record 319 shows that the evaluation criterion is that the file should be a file for which the 'data amount is less than a reference value' and that, in cases where the evaluation criterion is met, the file is rendered an 'entity' and the file is materialized.

Following the splitting of a plurality of files respectively which are obtained by splitting a file which has been judged to be a split file according to the above evaluation criteria, a judgment of a reference or entity is also carried out according to the above evaluation criteria. Furthermore, the condition of the above evaluation criteria is that it should be determined whether to perform the processing depending on whether correspondence can be achieved at the time by rewriting the application data model processing logic 144*a* and the data model and that there should be no splitting in the splitting process in cases where the processing cannot be performed. In cases where the processing cannot be performed, other conditions basically follow the original processing.

The configuration of the records of the OS/AP file evaluation criteria table 132 is not limited to the above configuration and other configurations are possible. The records may also be configured by a combination of a plurality of tables instead of being configured by a single table. The number of records is not limited to the number above and may be an arbitrary number.

FIG. 4 shows an example of a user data evaluation criteria table according to an embodiment of the present invention.

The user data evaluation criteria table 133 principally stores information constituting evaluation criteria for performing classification to determine whether to execute any of splitting at the data level of user application-related file, and reference processing or materialization processing. For example, in the case of a DBMS file, a user-stored table or schema corresponds to the evaluation target.

The user data evaluation criteria table 133 stores records which have an ID field 401, an evaluation criteria field 402, and a processing content field 403. The ID field 401 stores the ID of the record (record number, for example). The evaluation criteria field 402 stores the evaluation criteria. The processing content field 403 stores the processing content for handling the evaluation target in cases where the corresponding evaluation criteria are fulfilled.

The user data evaluation criteria table 133 is not limited to the above fields and may also include fields which describe information relating to the evaluation criteria and numerical values for the evaluation. In addition, the user data evaluation criteria table 133 is configured with one record for each evaluation criterion but is not limited to one record for each evaluation criterion. The user data evaluation criteria table 133 may also place items collected from different standpoints to include similar content in a single record.

Record 411 shows that the evaluation criterion is that the schema should be a schema 'designated as a customizable field', and that, in cases where the evaluation criterion is met, the field part is rendered an 'entity' and materialized. Record 412 shows that the evaluation criterion is that the schema should be a schema 'designated as a fixed value field' and that, in cases where the evaluation criterion is met, the field part is rendered a 'reference' and not materialized. Record 413 shows that the evaluation criterion is that the schema should be a schema shared between users according to which 'annotations appearing in the data model are master data or a reference or the like' and that, in cases where the evaluation criterion is met, the table or schema holding the data model is rendered a 'reference' and not materialized. Record 414 shows that the evaluation criterion is that the schema should be a schema which differs according to the user with which 'annotations appearing in the data model are user data or an entity or the like' and that, in cases where the evaluation criterion is met, the table or schema holding the data model is rendered an 'entity' and materialized.

Record 415 shows that the evaluation criterion is that table-related processing should be 'Lookup only and no Update/Insert' and that, in cases where the evaluation criterion is met, the table or schema is rendered a 'conditional reference' and not materialized. Record 416 shows that the evaluation criterion is that table-related processing should be 'Join processing is carried out but no Update/Insert' and that, in cases where the evaluation criterion is met, the table or schema is rendered a 'conditional reference' and not materialized.

Record 417 shows that the evaluation criterion is that a table data model-related attribute should have 'Update/Insert field locality' and that, in cases where the evaluation criterion is met, the table schema is rendered a 'conditional split' table and the table is split. Record 418 shows that the evaluation criterion is that the table attribute should be 'can be normalized' and that, in cases where the evaluation criterion is met, the table is rendered a 'conditional split' table and the table is split. Record 419 shows that the evaluation criterion for the table access frequency-related attribute is whether the 'access frequency is equal to or more than a reference value' and that, in cases where the evaluation criterion is met, the table is rendered an 'entity' and materialized. Record 420 shows that the evaluation criterion for a table data amount-related attribute is whether 'the table data amount is smaller than a reference value' and that, in cases where the evaluation criterion is met, the table is rendered an 'entity' and the table is materialized.

Following the splitting of a plurality of files respectively which are obtained by splitting a file which has been judged to be a split file according to the above evaluation criteria, a judgment of a reference or entity is also carried out according to the above evaluation criteria. Furthermore, the condition of the above evaluation criteria is that it should be determined whether to perform the processing depending on whether correspondence can be achieved at the time by rewriting the application data model processing logic 144*a* and the data model and that there should be no splitting in the splitting process in cases where the processing cannot be performed. In cases where the processing cannot be performed, other conditions basically follow the original processing.

The configuration of the records of the user data evaluation criteria table 133 is not limited to the above configuration and other configurations are possible. The records may also be configured by a combination of a plurality of tables instead of being configured by a single table. The number of records is not limited to the number above and may be an arbitrary number.

FIG. 16 shows an example of a mapping table according to an embodiment of the present invention.

The mapping table 129 is a table which holds information for managing the file correspondence between the files of the template virtual computer volume image 122 and the user-specific virtual computer volume image 123.

The mapping table 129 stores records including an ID field 1601, a file source field 1602, a corresponding file field 1603, a classification field 1604, a split field 1605, and a validity field 1606. The ID field 1601 stores a record ID (a record number, for example). The file source field 1602 stores the file name and/or path name of the file of the template virtual computer volume image 122. The corresponding file field 1603 stores the corresponding file name and/or path name of the user-specific virtual computer volume image 123. The classification field 1604 stores a classification of whether the corresponding file is materialized or referenced. The split field 1605 stores information indicating whether the corresponding file is split and indicating whether same is a pre-split file or a post-split file. In this embodiment, in cases where the corresponding file is a pre-split file, the split field 1605 stores information indicating that the corresponding file is a pre-split file and record IDs indicating a corresponding post-split files and, in cases where the corresponding file is post-split file, the split field 1605 stores information indicating that the corresponding file is a post-split file and a record ID indicating a corresponding pre-split file. The validity field 1606 stores information indicating whether the corresponding record is valid.

The mapping table 129 is not limited to the above fields and may also include fields which describe information relating to other mapping. In addition, the mapping table 129 is configured with one record for each file but is not limited to one record for each file. Items collected using different units such as directory units or other units can also be placed in a single record.

Record 1611 is a record relating to the file 'template 1: /usr/bin/' of the template virtual computer volume image 122 indicated by "template 1" and shows that this file corresponds to the file 'user*: /usr/bin' in an arbitrary user-specific virtual computer volume image 123, that this file has the classification 'reference' and that the file of the user-specific virtual computer volume image 123 (the file of file field 1603) references the file of the template virtual computer volume image 122 (the file appearing in the file field 1602) and does not hold an entity. It is clear that this file has not been split and that the entry is 'valid'.

Record 1612 is a record which relates to the file 'template 1: /home/root' of the template virtual computer volume image 122 indicated by "template 1" and shows that the file corresponds to the file 'user*: /home/root' of an arbitrary user-specific virtual computer volume image 123, that the file has the classification 'entity' and that the file of the user-specific virtual computer volume image 123 (the file of file field 1603) has an entity, and shows that the file is a pre-split file that has been split and which is currently not being used (is invalid). Although not shown, it is clear that the split field 1605 stores record numbers "4" and "5" corresponding to post-split files and that the records corresponding to the post-split files of record 1612 are records 1614 and 1615.

Record 1613 is a record which relates to the file 'template 1: /home/root/b.sh' of the template virtual computer volume image 122 indicated by "template 1" and shows that the file corresponds to a file '/home/root/b.sh' in an arbitrary user-specific virtual computer volume image 123, that the file has the classification 'entity', and that the file of the user-specific virtual computer volume image 123 (the file of file field 1603) has an entity. The configuration of the records of the mapping table 129 is not limited to the above configuration and other configurations are possible. The records may also be configured by a combination of a plurality of tables instead of being configured by a single table. The number of records is not limited to the number above and may be an arbitrary number.

FIG. 17 shows an example of a trace data table according to an embodiment of the present invention.

The trace data table 142 stores access information for access to files in a virtual computer volume image when the virtual computer hosting program execution unit 141 uses the virtual computer volume image. The trace data table 142 stores records which have an ID field 1701, an access file field 1702, an access type field 1703, an address field 1704, a frequency field 1705, and a data amount field 1706. The ID field 1701 stores a record ID (record number, for example). The access file field 1702 stores the accessed file name and/or path name. The access type field 1703 stores the access as any of read only, write only or read/writable. The address field 1704 stores the accessed address in the file and the address of the whole file. The frequency field 1705 stores the access frequency. The data amount field 1706 stores the accessed data amount (in megabyte units, for example).

The trace data table 142 is not limited to the above fields and may also include fields describing information relating to other trace data. In addition, the trace data table 142 is configured with one record for each accessed file but is not limited to having one record for each accessed file. Items collected using different units such as directory units or segment units can also be placed in a single record.

Record 1711 is a record relating to the file '/usr/bin' of the user-specific virtual computer volume image 123, and shows that the access type is 'Read', that is, only read processing is permitted, and also shows that, regarding the addresses of the files constituting the access destination are concerned, only the beginning part (addresses (AA00 to BB00)) of all the addresses (AA00-CC00) of the file are accessed, the access frequency is fifty times, and the data amount is one hundred units. Record 1712 is a record which relates to the file '/home/root' in the user-specific virtual computer volume image 123, that the access type is 'Read/Write', that is, that both read and write processing are permitted, and that access is to local addresses (CC00 to CC0A) only at the small beginning part of all the addresses (CC00 to DD00) of the file constituting the access destination.

Record 1713 is a record which relates to the file '/home/root/b.sh' in the user-specific virtual computer volume image 123 and shows that the access type is 'Read', that is, that only read processing is permitted, that access is to the addresses (EE00 to EF00) spanning the whole of the file constituting the access destination, and that the access frequency is high at five hundred times. The configuration of the records of the trace data table 142 is not limited to the above configuration and other configurations are possible. The records may also be configured by a combination of a plurality of tables instead of being configured by a single table. The number of records is not limited to the number above and may be an arbitrary number.

FIG. 18 shows an example of a file list table according to an embodiment of the present invention.

A file list table 135 stores information relating to the files included in the virtual computer volume images 121 to 125.

The file list table 135 stores records which have an ID field 1801, a file name field 1802, and a classification field 1803. The ID field 1801 stores a record ID (a record number, for example). The file name field 1802 stores a file name and/or a path name. The classification field 1803 stores a classification indicating whether the corresponding file is an OS-related file common to users (an OS non-user file), whether the corresponding file is a file used by each user (a user file), or whether the corresponding file is an application file (an AP file). The file list table 135 is not limited to the above fields and may also include fields describing information relating to the other files. Furthermore, the file list table 135 is configured with one record for each file but is not limited to one record for each file. Items collected using different units such as directory units or other units can also be placed in a single record.

Record 1811 is a record which relates to the file '/opt/DBMS/osfiles' in the virtual computer volume images of virtual volumes 121 to 125 and shows that the corresponding file is an OS non-user file. Record 1812 is a record which relates to the file '/home/root/c.sh' in the virtual computer volume images of virtual volumes 121 to 125 and shows that the corresponding file is a file used by each user. Record 1813 is a record which relates to the file 'opt/DBMS/*' in the virtual computer volume images of the virtual volumes 121 to 125 and shows that the corresponding file is an application-related file. The configuration of the records of the file list table 135 is not limited to the above configuration and other configurations are possible. The records may also be configured by a combination of a plurality of tables instead of being configured by a single table. The number of records is not limited to the number above and may be an arbitrary number.

FIG. 19 shows an example of an update file list table according to an embodiment of the present invention.

The update file list table 146 stores information indicating which file in the virtual computer volume image should be updated. The update file list table 146 is used when updating an application or OS file or other file for configuring a virtual computer.

The update file list table 146 stores records which have an ID field 1901, a file name field 1902, a classification field 1903, and a remarks field.

The ID field 1901 stores a record ID (a record number, for example). The file name field 1902 stores the file name and/or path name to be updated. The classification field 1903 stores a classification which indicates whether the corresponding file is an OS-related file common to users (an OS non-user file), whether the corresponding file is a file used by each user (a user file), or whether the corresponding file is an application file (AP file). The update file list table 146 is not limited to the above fields and may also include other fields which describe information relating to update files. In addition, the update file list table 146 is configured with one record for each file but is not limited to one record for each file. Items collected using different units such as directory units or other units can also be placed in a single record. The entity of an update file is stored in a predetermined storage area.

Record 1911 is a record which relates to the file '/usr/bin' in a virtual computer volume image and shows that the corresponding file is an OS-related file. Record 1912 is a record which relates to the file '/home/root/b.sh' in the virtual computer volume image and shows that the corresponding file is a user-related file. Record 1913 is a record which relates to the file '/opt/DBMS/*' in the virtual computer volume image and shows that the corresponding file is an application-related file. The configuration of the records of the update file list table 146 is not limited to the above configuration and other configurations are possible. The records may also be configured by a combination of a plurality of tables instead of being configured by a single table. The number of records is not limited to the number above and may be an arbitrary number.

Figure 6:
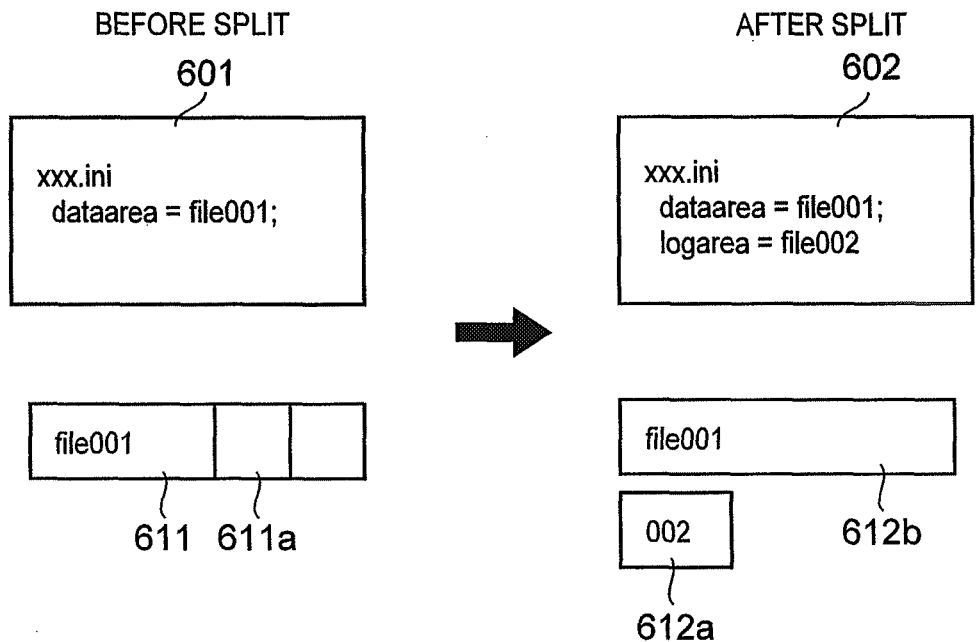
FIG. 6 provides a first view illustrating application data model processing logic and splitting thereof according to an embodiment of the present invention.
Figure 7:
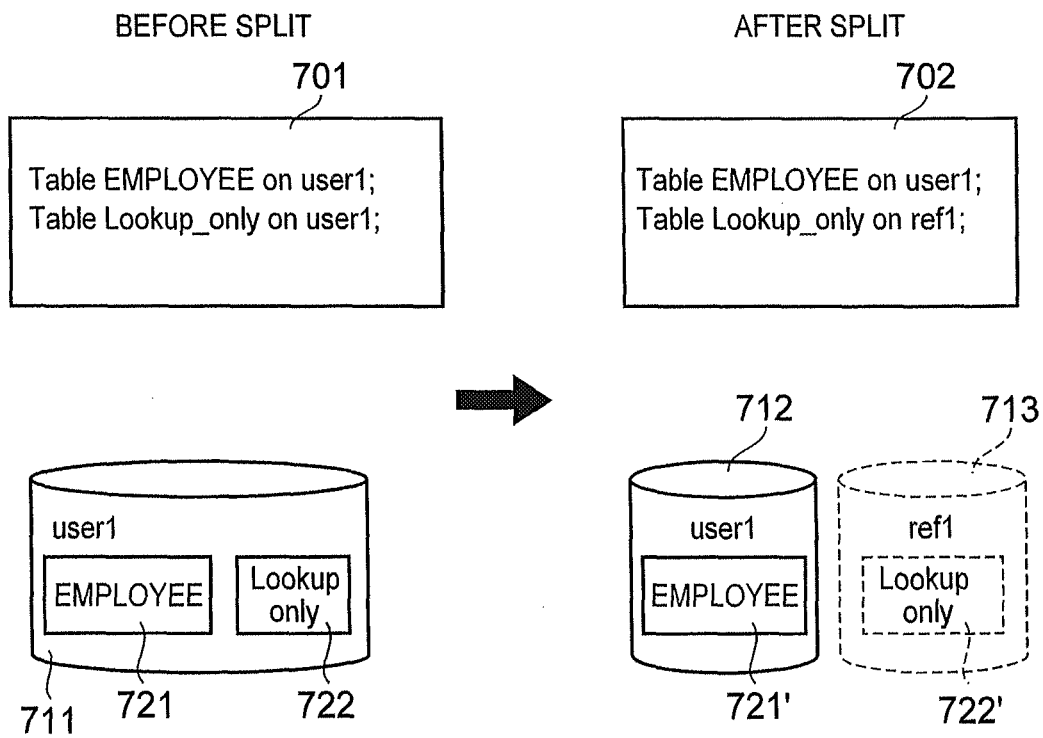
FIG. 7 provides a second view illustrating application data model processing logic and splitting thereof according to an embodiment of the present invention.

FIGS. 6, 7, and 8 illustrate application data model processing logic and splitting thereof according to an embodiment of the present invention. The left-hand sides of FIGS. 6 and 7 show the states of each of the parts before splitting and the right-hand sides of FIGS. 6 and 7 show the states of each of the parts after splitting. The upper part of FIG. 8 shows the states of each of the parts before splitting and the lower part of FIG. 8 shows the states of each of the parts after splitting.

The application data model processing logic 144a and 144b store information relating to the application processing logic and data model running on the virtual computer, in other words, information on file handling by the application.

In FIG. 6, the application data model processing logic 144a stores the application setting 601. The application setting 601 is set with the file used by the application, the name of the file, such as "file001", for example. The file 611 is a file with the file name "file001" and is stored in the user-specific virtual computer volume image 123. File 611 is used so that a part 611a is updated locally.

In cases where the application setting 601 is stored in the application data model processing logic 144a, the verification and splitting unit 134 modifies the application setting 601 to use file001 and file002 as indicated by the application setting 602 and splits file 611 of the user-specific virtual computer volume image 123 into a file 612b of a part that has not been locally updated and a file 612a which corresponds to locally updated part 611a.

In FIG. 7, the application data model processing logic 144a stores an application data storage method 701. The application data storage method 701 features the storage of an employee table and Lookup_only table in a file with the file name user1.

File 711 is a file with the file name user1 and is stored in the user-specific virtual computer volume image 123. File 711 stores employee table 721 and Lookup_only table 722.

In cases where application storage method 701 is stored in application data model processing logic 144a, the verification and splitting unit 134 modifies the application data storage method 701 to store the employee table in a file with the file name user1 and store the Lookup_only table in a file with the file name ref1 as indicated by application data storage method 702 and splits the file 711 of the user-specific virtual computer volume image 123 into a file 712 with the file name file 1 which stores an employee table 721' and a file 713 with the file name ref1 which stores a Lookup_only table 722'.

In FIG. 8, the application data model processing logic 144a stores an application data logic 851 for a table and an application data model (table) 810. The application data logic 851 features logic that is updated by setting xx in the Qty field of a record in which an id field is aa and a factory field is bb in Table 1.

The application data model (table) 810 has an ID field 801, a data field 802, a processing field 803, and a key value field 804. The ID field 801 stores a record ID (record number). The data field 802 stores the name of the data field. The processing field 803 stores the processing type of the corresponding data field. The processing field 803 stores Select in cases where the corresponding data field is used in the selection and stores Update in cases where the corresponding data field is updated. The key value field 804 stores information on whether the corresponding data field is a key value. True is stored in key value field 804 in cases where the corresponding data field is a key value, for example.

Record 811 is a record which relates to the ID field and shows that the data of the ID field is a key value and that the processing is Select. Record 812 is a record which relates to the Qty field and shows that there is no key value and that the processing is Update, in other words, that there is the possibility of update writing being included. Records 813 to 815 show that there is no key value and that the processing is SELECT.

In cases where application data logic 851 and application data model 810 are stored in the application data model processing logic 144a, the verification and splitting unit 134 splits the application data model 810 as shown into the application data model 820 and application data model 830. In other words, the verification and splitting unit 134 splits the application data model 810 into the application data model 820 which contains a record with a key value data field and a data field for performing Update processing and the application data model 830 which contains data fields other than the key value data field and data field for performing Update processing. As a result, because an update is not generated for a file which stores a table represented by the application data model 830, the file can be rendered a referencing file.

In addition, the verification and splitting unit 134 modifies the application data logic 851 so that same is able to execute the same processing for the post-split application data models 820 and 830 as indicated by application data logic 852. The application data logic 852 features logic which is updated by setting xx in the Qty field of a record of Table 1 in which the ID of the ID field of Table 1 which corresponds to the application data model 820 and the ID of the ID field of Table 2 which corresponds to the application data model 830 are aa and the factory field of Table 2 is bb.

The application data model processing logic 144a is not limited to the configuration shown in FIGS. 6 to 8 and may also have a different configuration, being configured to contain items storing information relating to the application data model processing logic, for example. In addition, in this embodiment, the application data model processing logic 144a represents a record by means of a schematic diagram containing text, a table and files but may also bring together records using different units.

The file verification and split processing according to this embodiment will be described next.

Figure 5:
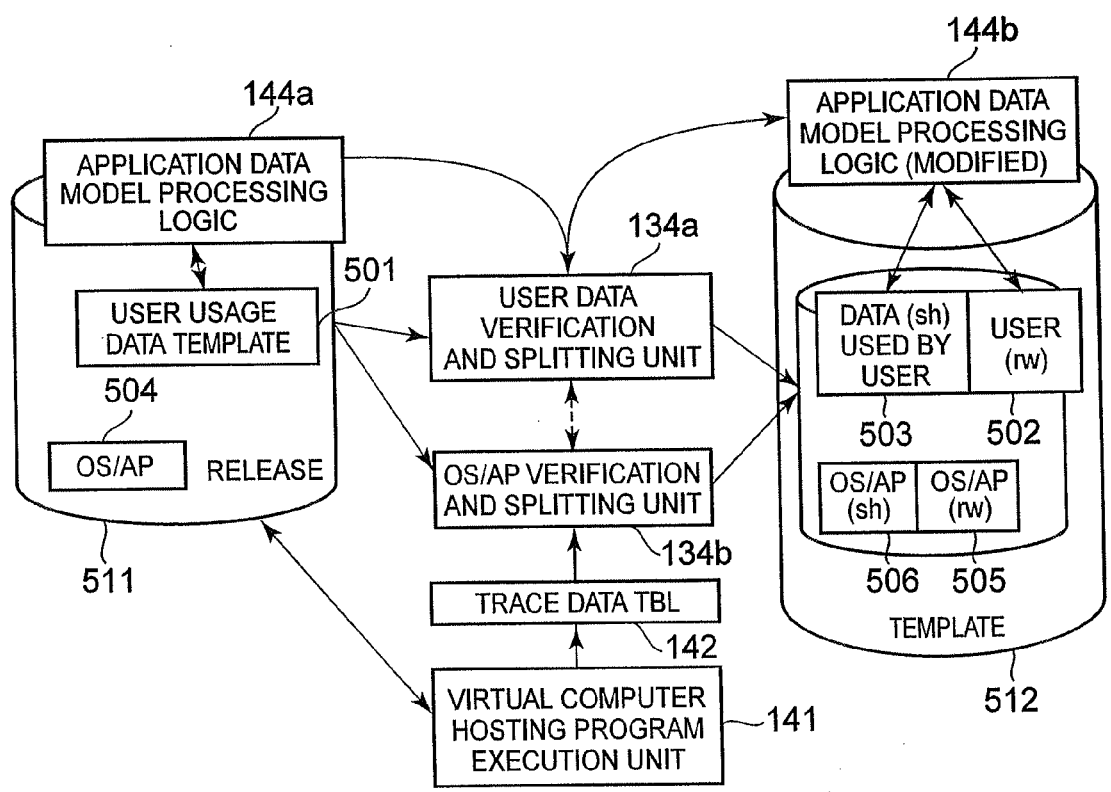
FIG. 5 provides a schematic view of file verification and splitting processing according to an embodiment of the present invention.

FIG. 5 is a schematic view of file verification and splitting processing according to an embodiment of the present invention. FIG. 5 shows an outline of verification and splitting processing but all the constituent elements do not necessarily appear.

The release virtual computer volume image 121 stores an OS/AP-related file 504, a user usage data template file 501, and the application data model processing logic 144a. The template virtual computer volume image 122 is the virtual computer volume image after processing by the verification and splitting unit 134.

The user data verification and splitting unit 134a is a functional part which executes user data-related processing in the verification and splitting unit 134. The user data verification and splitting unit 134a performs processing to determine any of splitting, referencing, and materialization of the user usage data template file 501 based on evaluation criteria of the application data model processing logic 144a and user data evaluation criteria table 133. In the template virtual computer volume image 122, the user data verification and splitting unit 134a splits the user usage data template file 501 into a user usage data (sh) file 503 which is a file that can be shared and serve as a reference and a user-data (rw) file 502 which is a part that cannot be shared but can be rewritten to be specific to a user, and stores files 503 and 502. The application data model processing logic 144a is then rewritten in correspondence with the split files and stored as the application data model processing logic (modified) 144b by the user data verification and splitting unit 134a.

The OS/AP verification and splitting unit 134b is a functional part that executes the OS/AP-related processing of the verification and splitting unit 134. The OA/AP verification and splitting unit 134b performs processing to determine any of splitting, referencing, and materialization of the OS/AP file 504 based on the trace data table 142 and OS/AP file evaluation criteria table 132 which are obtained as a result of the release virtual computer volume image 121 being executed by the virtual computer hosting software execution unit 141. In the template virtual computer volume image 122, the OS/AP verification and splitting unit 134b splits the OS/AP file 504 into an OS/AP (sh) file 506 which is a file that can be shared and which may serve as a reference and an OS/AP (rw) file 505 which is a part that cannot be shared but can be rewritten to be specific to a user, and stores files 506 and file. By further customizing the template virtual computer volume image 122 created by this processing for each user, the provision to the user of services in which customization is maintained and the efficient usage of storage through redundancy elimination are achieved.

The details of the processing of computer system 1 of this embodiment will be described hereinbelow.

Figure 9:
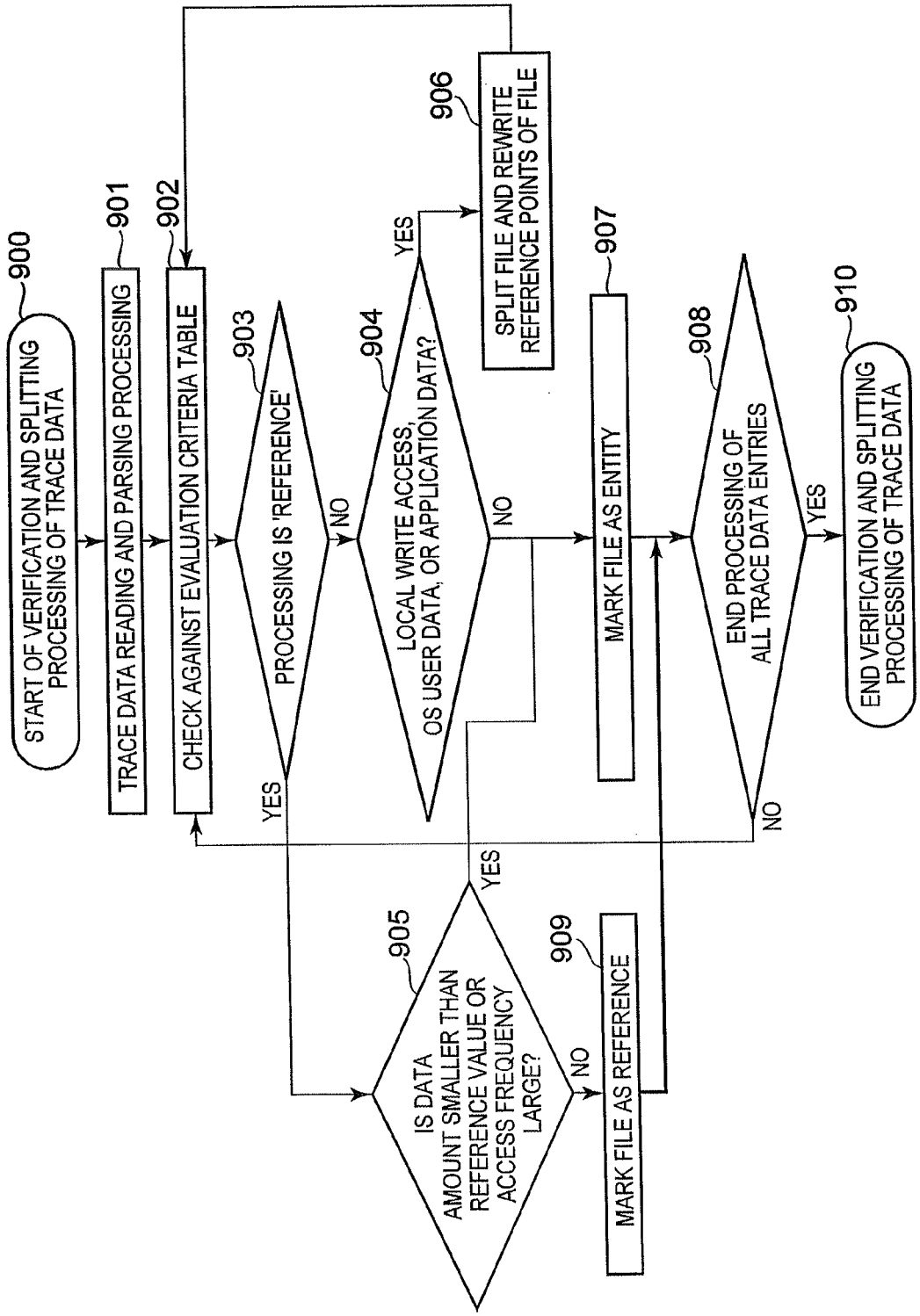
FIG. 9 is a flowchart of verification and splitting processing of trace data according to an embodiment of the present invention.

FIG. 9 is a flowchart of verification and splitting processing of trace data according to an embodiment of the present invention.

First, when the processing by the verification and splitting unit 134 is started by the management console 151, verification and splitting processing of the trace data of the trace data table 142 (step 900) is started. The verification and splitting unit 134 then performs reading and parsing processing (analysis) of the trace data of the trace data table 142 and collects the results of the parsing processing for each file (step 901).

Thereafter, the verification and splitting unit 134 checks the trace data record against each record of the OS/AP file evaluation criteria table 132, that is, detects a record in the OS/AP file evaluation criteria table 132 for which the file stored in the trace data record satisfies the evaluation criteria (step 902). The verification and splitting unit 134 then judges whether the processing field 303 of the record satisfying the evaluation criteria is a 'reference' (step 903).

As a result, in cases where it is judged that the processing field 303 is a reference (step 903: Yes), the verification and splitting unit 134 judges whether the data amount of the corresponding file is smaller than a predetermined reference value and judges whether the frequency of access to the corresponding file is greater than a predetermined frequency (step 905). In cases where it is judged that the data amount is smaller than the predetermined reference value or where it is judged that the access frequency is greater than the predetermined frequency, the verification and splitting unit 134 places an entity mark in the classification field 1604 of the record of the corresponding file in the mapping table 129 (step 907). However, in cases where it is judged that the data amount is not smaller than the predetermined reference value and the access frequency is not greater than the predetermined frequency, the verification and splitting unit 134 places a reference mark in the classification field 1604 of the record of the corresponding file in the mapping table 129 (step 909).

On the other hand, in cases where it is judged in step 903 that the processing field 303 is not a reference (step 903: No), the verification and splitting unit 134 judges whether the corresponding file has undergone local Write access, whether the corresponding file is OS user data, and whether the corresponding file is application data (step 904). Here, the judgment of whether the corresponding file has undergone local Write access, whether the corresponding file is OS user data, and whether the corresponding file is application data is also an example of an evaluation criterion.

As a result, in cases where it is judged that it is true that either the file has undergone local Write access, that the file is OS user data, or that the file is application data, the verification and splitting unit 134 splits the file, stores the split files (entities) in the template virtual computer volume image 122 and registers the split files in the mapping table 129, and then modifies the record which corresponds to the pre-split file of the trace data table 142 to a record which corresponds to the respective post-split files (step 906) and executes the processing from step 902.

However, in cases where it is judged that it is not true that the file has either undergone local Write access, is OS user data, and application data (step 904: No), the verification and splitting unit 134 places an entity mark in the classification field 1604 of the record of the corresponding file of the mapping table 129 (step 907).

After marking the mapping table 129 in step 907 or 909, the verification and splitting unit 134 judges whether processing of all of the entries in the trace data table 142 is complete (step 908) and, when the processing is not complete, executes the processing from step 902. When the processing of all of the entries is complete, the verification and splitting unit 134 ends the verification and splitting processing (step 910).

Here, a case where, in the verification and splitting processing of the trace data, the records 311, 312, 313, and 314 shown in FIG. 3 are stored in the OS/AP file evaluation criteria table 132, for example, and the records 1711 to 1713 shown in FIG. 17 are stored in the trace data table 142 will be described by way of an example. The verification and splitting unit 134 checks the records 1711 to 1713 of the trace data table 142 against the records 311 to 314 of the OS/AP file evaluation criteria table 132 (step 902). When performing the check first on record 1711 of the trace data table 142, because the access type of the user file is Read, the verification and splitting unit 134 judges that record 1711 corresponds to record 312 and that the processing field 303 is 'reference' (step 903) and performs a data amount and an access frequency judgment (step 905). Here, when it is judged that the access frequency of the record 1711 is equal to or less than a reference value, the verification and splitting unit 134 renders the classification field 1604 'reference' as shown in record 1611 of the mapping table 129 (step 909) and then judges whether the processing of all of the entries of the trace data table 142 is complete (step 908) and continues processing because records 1712 and 1713 still remain. Record 1712 is also checked in steps 902 and 903 and, because record 1712 corresponds to record 313 of the OS/AP file evaluation reference table 132, a local Write access judgment or other judgment is carried out (step 904). Because it is judged that local Write access has been made, the file is split and the split files (entities) are stored in the template virtual computer volume image 122 and a record 1612 which corresponds to the pre-split file of the mapping table 129 is made 'pre-split, invalid' and new records 1614 and 1615 are created and updated as 'post-split, valid', whereupon the processing from step 902 is executed for these files (step 906). Here, the '/home/root' file is split into two files which are a file of a part with addresses corresponding to CC00 to CC0A and a file of a part with addresses corresponding to CC0A to DD00, whereupon these files are made '/home/root1' and '/home/root2' respectively, and the processing from step 902 is carried out on the respective files.

As a result, the verification and splitting unit 134 marks the file '/home/root1' for materialization because this file corresponds to record 313 of the OS/AP file evaluation criteria table 132 (step 907) and marks the file '/home/root2' as 'reference' because this file corresponds to record 311 of the OS/AP file evaluation criteria table 132 (step 907). The verification and splitting unit 134 also executes the processing of step 902 for record 1713 and, because it is judged that record 1713 corresponds to record 312 of the OS/AP file evaluation criteria table 132 and conforms to the condition of step 905, the verification and splitting unit 134 updates the classification field 1604 of record 1613 in the mapping table 129 as 'entity' (step 907). As a result, it is judged that the processing of all of the records 1711 to 1713 in the trace data table 142 is complete (step 908) and the verification and splitting unit 134 ends the verification and splitting processing of the trace data (step 910).

Figure 10:
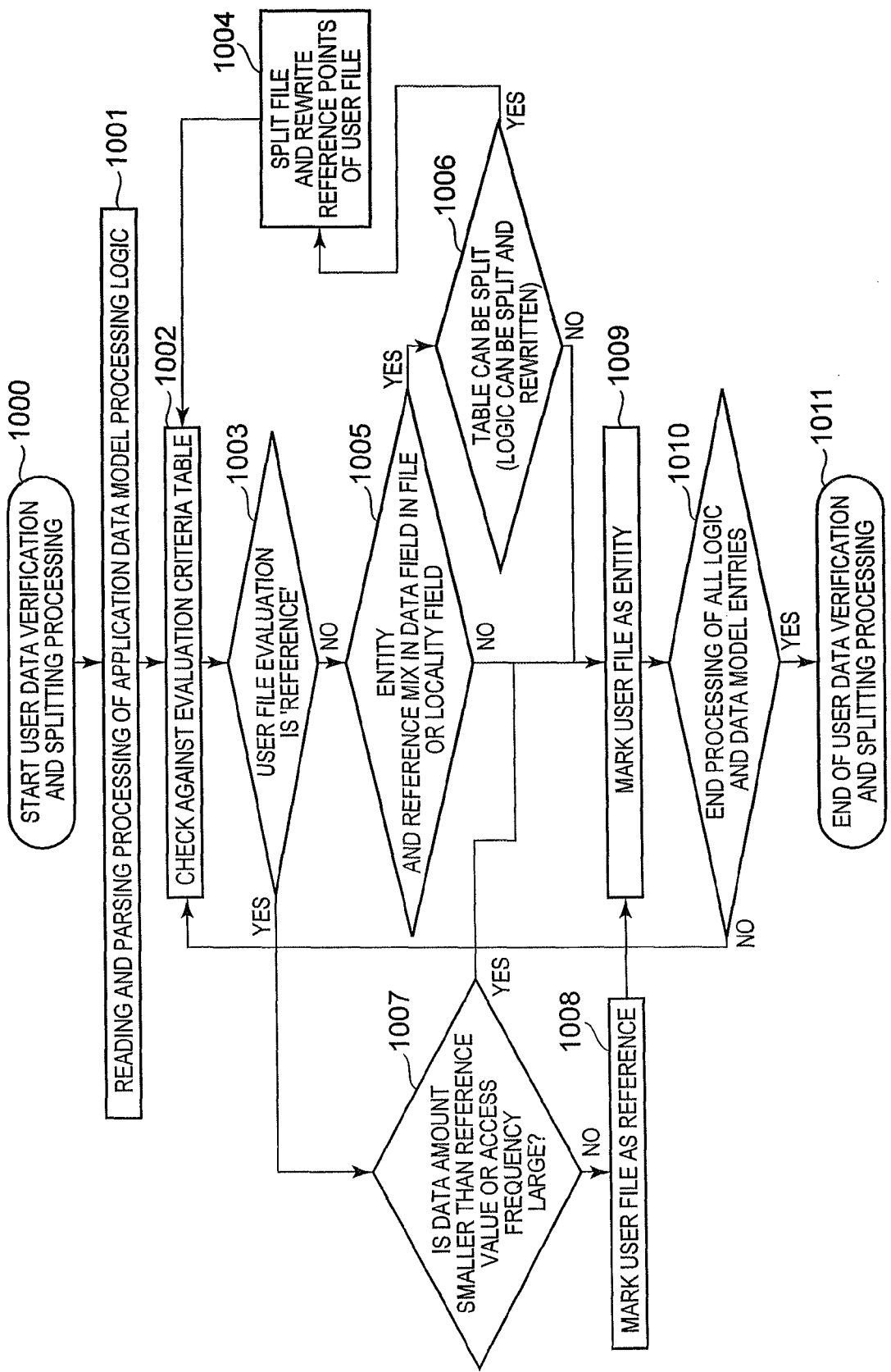
FIG. 10 is a flowchart of verification and splitting processing of user data according to an embodiment of the present invention.

FIG. 10 is a flowchart of verification and splitting processing of user data according to an embodiment of the present invention.

First, when the processing by the verification and splitting unit 134 is started by the management console 151, verification and splitting processing of application data model processing logic (step 1000) is started. Thereafter, the verification and splitting unit 134 effects reading and parsing processing of the application data model processing logic 144a and collects the results of the parsing for each file (step 1001).

The verification and splitting unit 134 then checks the application data model processing logic against each of the records of the user data evaluation criteria table 133, that is, detects records in the user data evaluation criteria table 133 for which the file stored in the application data model processing logic satisfies the evaluation criteria (step 1002). Thereafter, the verification and splitting unit 134 judges whether the processing field 403 of the records satisfying the evaluation criteria is 'reference' (step 1003).

As a result, in cases where it is judged that the processing field 403 is 'reference' (step 1003: YES), the verification and splitting unit 134 judges whether the data amount of the corresponding file is smaller than a predetermined reference value and whether the access frequency is greater than a predetermined reference value (step 1007). In cases where it is judged that the data amount is smaller than the predetermined reference value or where the access frequency is greater than the predetermined reference value (step 1007: Yes), the verification and splitting unit 134 places an entity mark in the classification field 1604 of the record of the corresponding file of the mapping table 129 (step 1009). However, in cases where it is judged that the data amount is not smaller than the predetermined reference value and that the access frequency is not greater than the predetermined frequency, the verification and splitting unit 134 places a reference mark in the classification field 1604 of the record of the corresponding file in the mapping table 129 (step 1008).

However, in cases where it is judged in step 1003 that the processing field 403 is not 'reference' (step 1003: No), the verification and splitting unit 134 judges whether there is an entity and reference mix in the data field in the corresponding file and whether field locality is present (step 1005). As a result, in cases where it is judged that it is true that there is an entity and reference mix in the data field in the corresponding file or that field locality is present, the verification and splitting unit 134 judges whether the file or table or the like can be split (step 1006). If the file or table or the like can be split, the verification and splitting unit 134 splits the file, stores the split files (entities) in the template virtual computer volume image 122 and registers the split files in the mapping table 129, and then modifies the record which corresponds to the pre-split file of the trace data table 142 to a record which corresponds to each of the post-split files (step S1004) and executes the processing from step 1002.

However, in cases where it is judged that it is not true for the file that there is an entity and reference mix in the data field in the corresponding file and that field locality is present (step 1004: No) or, in cases where it is judged that the file and table cannot be split (step 1006: No), the verification and splitting unit 134 places an entity mark in the classification field 1604 of the record of the corresponding file of the mapping table 129 (step 1009).

After marking the mapping table 129 in step 1008 or 1009, the verification and splitting unit 134 judges whether processing of all of the entries in the application data model processing logic 144a is complete (step 1010) and, when the processing is not complete, executes the processing from step 1002. However, when the processing of all of the entries is complete, the verification and splitting unit 134 ends the splitting processing (step 1011).

Here, a case where, in the verification and splitting processing of the user data, for example, records 415 to 418 shown in FIG. 4 are stored in the user data evaluation criteria table 133, and the application setting (record) 601, application data storage method (record) 701, and the application data logic (record) 851 for the table shown in FIGS. 6 to 8 are stored in the application data model processing logic 144a will be described by way of an example.

The verification and splitting unit 134 checks record 601 and file 611 evaluation criterion (step 1002) and judges that part 611a of file 611 corresponds to record 417 (step 1005) and performs a judgment of whether record 601 can be split (step 1006). Here, when it is judged that it is possible to split record 601 by means of the application settings for utilizing record 601, the verification and splitting unit 134 splits the user file into files 612a and 612b, stores the split files (entities) in the template virtual computer volume image 122, and rewrites record 601 which references the file to generate record 602 (step 1004).

Thereafter, the verification and splitting unit 134 performs a check of the respective post-split files 612a and 612b by returning to step 1002, marking file 612a as an 'entity' (step 1009) and marking file 612b as a 'reference' (step 1008). In the mapping table 129, record 1617 is updated and records 1618 and 1619 are added. The verification and splitting unit 134 also outputs record 602 as application data model processing logic (modified) 144b. Thereafter, because records remain (step 1010), the verification and splitting unit 134 processes record 701 and file 711. The verification and splitting unit 134 checks record 701 and file 711 against the evaluation criteria (step 1002), judges that area 721 corresponds to record 417 (step 1005) and judges whether record 701 can be split (step 1006).

Here, the verification and splitting unit 134 judges that the file can therefore be split because there are clean breaks between the areas with no crossover. The verification and splitting unit 134 splits the user file 711 into files 712 and 713 and stores same in the template virtual computer volume image 122, rewrites record 701 which references file 711, and generates record 702 for referencing files 712 and 713 (step 1004).

Thereafter, the verification and splitting unit 134 evaluates the generated files 712 and 713 by returning to step 1002, marking file 712 as 'entity' (step 1009) and marking file 713 as 'reference' (step 1008), updates record 1620 in the mapping table 129, and adds records 1621 and 1622 thereto. The verification and splitting unit 134 also outputs record 702 as the application data model processing logic (modified) 144b.

Subsequently, the verification and splitting unit 134 performs a check against the evaluation criteria with the record 851 and the table holding data model 810 serving as the processing target (step 1002). Because records 811 and 812 which are fields #1 and #2 of the data model 810 correspond to records 417 and 418, the verification and splitting unit 134 references the processing content of record 851 and judges that the table can be split (step 1006). In step 1004, the verification and splitting unit 134 splits the data model 810 into data model 820 and data model 830 and modifies record 851 as indicated by record 852 so that the split data models 820 and 830 can be processed in the same way as the pre-split data model 810.

Thereafter, the verification and splitting unit 134 checks the data models 820 and 830 by returning to step 1002, marking data model 820 as 'entity' (step 1009) and marking data model 830 as 'reference' (step 1008), updates record 1623 in the marking table 129, and adds records 1624 and 1625 thereto. Further, the verification and splitting unit 134 outputs record 852 as the application data model processing logic (modified) 144b. The verification and splitting unit 134 then ends the verification and splitting processing of the user data because the processing of the data of all the file lists and the user data model logic is complete (step 1011).

Either the verification and splitting processing of the trace data or the verification and splitting processing of the user data may be executed first.

Figure 13:
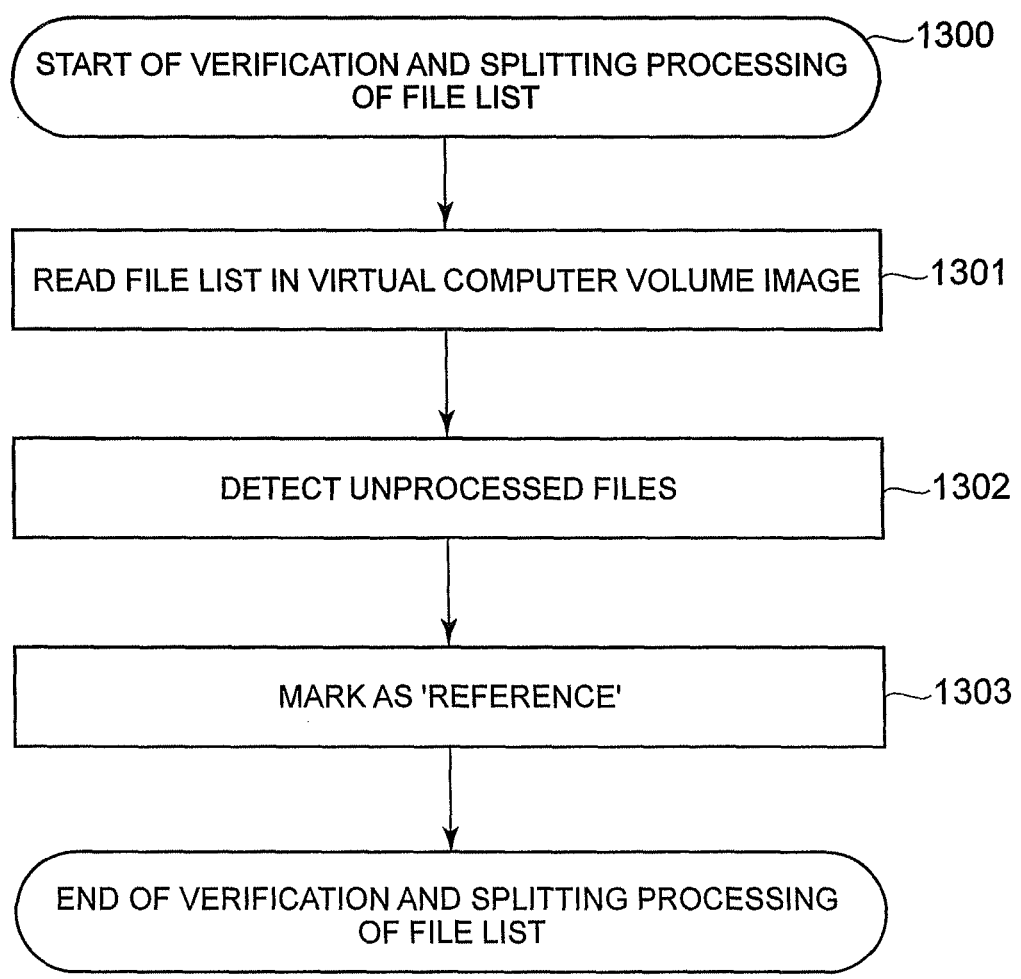
FIG. 13 is a flowchart of verification and splitting processing of a file list according to an embodiment of the present invention.

FIG. 13 is a flowchart of verification and splitting processing of a file list according to an embodiment of the present invention. This processing is executed following the verification and splitting processing shown in FIGS. 9 and 10, for example.

First, when the processing by the verification and splitting unit 134 is started by the management console 151, the verification and splitting unit 134 reads the file list from the file list table 135 (step 1301). The verification and splitting unit 134 then detects an unprocessed file in the file list (step 1302). Access to the unprocessed file does not occur in normal usage of the virtual computer volume image. Further, because this means that the file is a file for which the possibility of access occurring is small, the verification and splitting unit 134 places a reference mark in the classification field 1604 of the record of the corresponding file in the mapping table 129 (step 1303). In cases where there are also other unprocessed files, step 1303 is repeated. In an initial state, 'reference' is recorded in the records corresponding to all the files of the mapping table 129. Subsequently, the verification and splitting processing shown in FIGS. 9 and 10 is executed and only the records corresponding to files which need to be made 'split' or 'entity' files may be marked to that state. In this case, there is no need to execute the verification and splitting processing shown in FIG. 13.

Here, a case where, in the verification and splitting processing of the file list, for example, records 1811 to 1813 shown in FIG. 18 are stored in the file list table 135 and the file corresponding to record 1813 is processed in the verification and splitting processing of FIG. 10 will be described by way of example.

The verification and splitting unit 134 reads the file list from the file list table 135 (step 1301) and detects unprocessed files (step 1302). Here, it is detected that records 1811 and 1812 are records which have not been processed thus far. Because access has not occurred for these files 1811 and 1812 or these are files for which the possibility of access occurring is small, the verification and splitting unit 134 places a 'reference' mark in the classification field 1604 of records 1626 and 1627 in the mapping table 129 (step 1303). As a result of this process, it is possible to suitably determine the states of files for which processing is not performed and trace data are not output.

As a result of the verification and splitting processing shown in FIGS. 9, 10, and 13, files for which splitting is judged to be possible are split into a plurality of files which are stored in the template virtual computer volume image 122, and an indication of whether the corresponding files are either entities or references is stored in each of the records of the mapping table 129.

Figure 11:
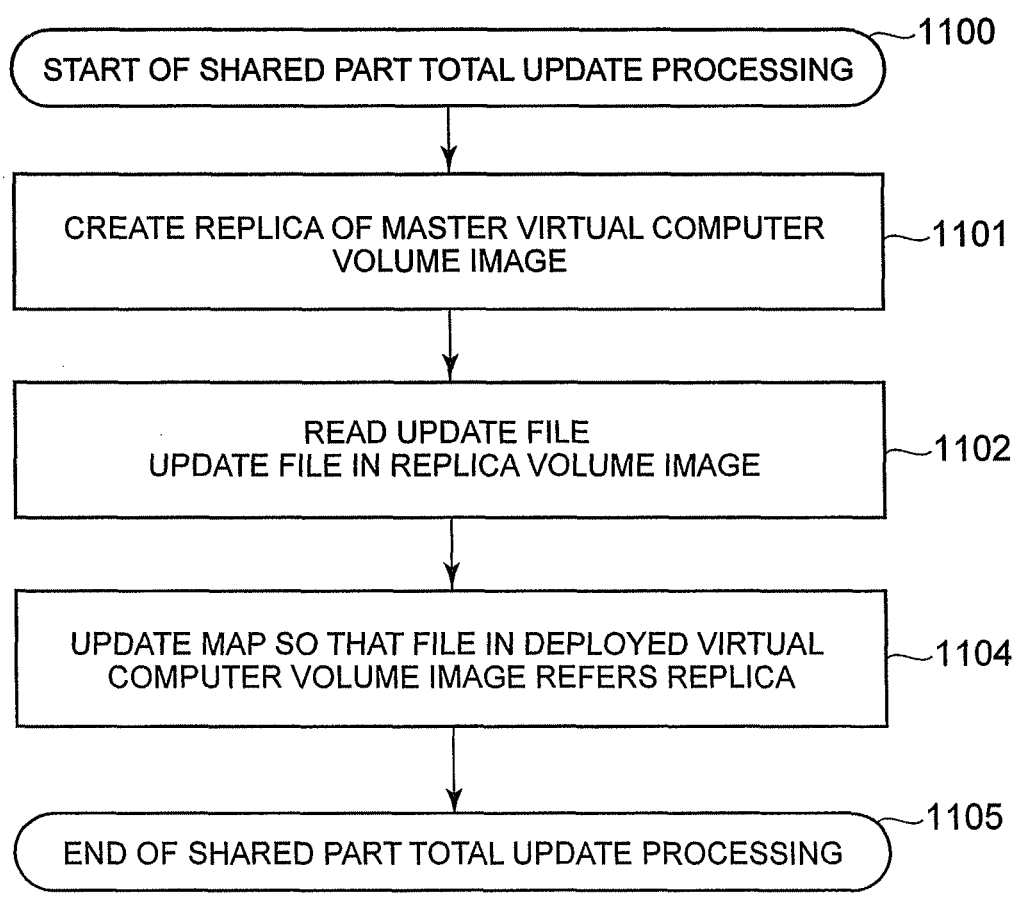
FIG. 11 is a flowchart of shared part total update processing according to an embodiment of the present invention.

After the verification and splitting processing shown in FIGS. 9, 11, and 13 has been executed, the virtual computer storage management and configuration modification program execution unit 131 creates a user-specific virtual computer volume image 123 which is to be provided for each user on the basis of the template virtual computer volume image 122 and mapping table 129. That is, the virtual computer storage management and configuration modification program execution unit 131 references each record of the mapping table 129 and, in cases where a corresponding file is a reference file, the virtual computer storage management and configuration modification program execution unit 131 renders the file in the user-specific virtual computer volume image 123 a file for referencing the template virtual computer volume image 122. In cases where the corresponding file is an entity file, the virtual computer storage management and configuration modification program execution unit 131 extracts the entity of the file from the template virtual computer volume image 122 and stores the entity in the virtual computer volume image 123. Thereafter, the virtual computer hosting program execution unit 141 is able to configure a virtual computer by executing the virtual computer volume image 123 and is able to provide the user with services.

Thus, with the computer system according to this embodiment, originally one file is split into a plurality of files and at least one file can be configured to reference the template virtual computer volume image 122 in the virtual computer volume image 123. That is, because SI (single instancing) can be implemented, the storage efficiency of the storage device 220 can be improved in cases where a plurality of virtual computer volume images 123 are prepared.

Processing to update files in cases where it is necessary to update an OS file, an application file or user data file, or another file after providing each user with a user-specific virtual computer volume image 123 will be described next.

FIG. 11 is a flowchart of shared part total update processing according to an embodiment of the present invention. Shared part total update processing is update processing in which the updated file is common to all the users and a file only requiring an update in the template virtual computer volume image 122 is updated.

First, the update processing is started when the join modification unit 136 is started up as a result of the computer system administrator operating the management console 151 (step 1100). The join modification unit 136 creates a replica virtual computer volume image 124 which is a replica of the template virtual computer volume image 122 (step 1101). After creating the replica virtual computer volume image 124, the join modification unit 136 reads the update file corresponding to a file in the record of the update file list table 146 which is common to all users and unproblematic even when replaced and replaces the corresponding file in the replica virtual computer volume image 124 with the update file (step 1102). For example, in FIG. 19, the file which corresponds to record 1911 whose classification is 'OS' is a file which is common to all users and unproblematic even when replaced.

The join modification unit 136 then updates the mapping table 129 to reference the replica virtual computer volume image 124 as the reference destination for each file in the user-specific virtual computer volume image 123 after replacing the file (step 1104) and ends the shared part total update processing (step 1105). As a result, the replica virtual computer volume image 124 becomes a new template virtual computer volume image 122.

Figure 12:
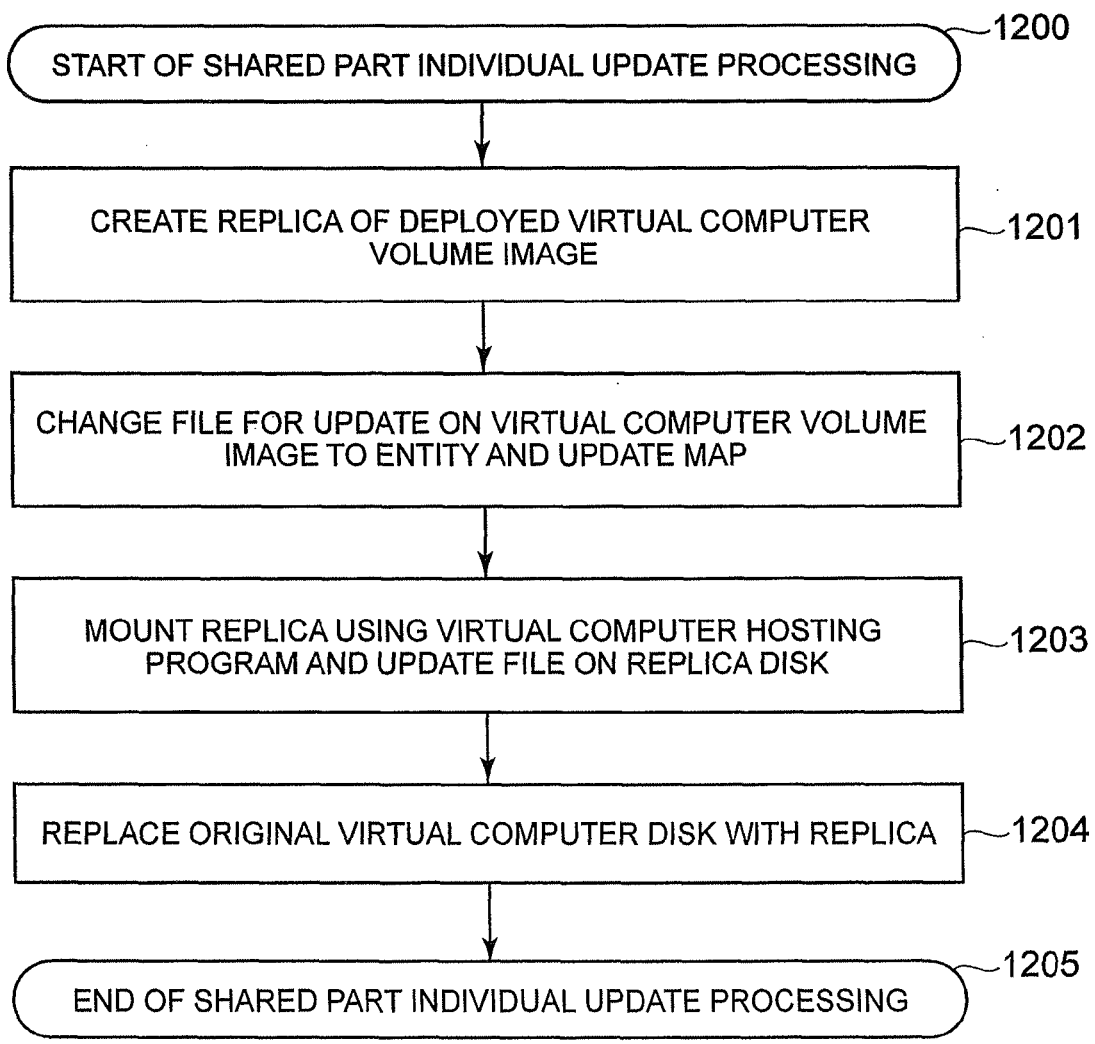
FIG. 12 is a flowchart of shared part individual update processing according to an embodiment of the present invention.

FIG. 12 is a flowchart of shared part individual update processing according to an embodiment of the present invention. The shared part individual update processing is update processing for updating a file where the file is a file of data which are different for each user but the file itself is not split.

First, the update processing is started when the join modification unit 136 is started up as a result of the computer system administrator operating the management console 151 (step 1200). The join modification unit 136 creates a replica virtual computer volume image 124 which is a replica of the user-specific virtual computer volume image 123 (step 1201). After creating the replica virtual computer volume image 124, the join modification unit 136 reads the update file which corresponds to a file in the record of the update file list table 146 where the file is a file of data which are different for each user but the file itself is not split and, if the file in the replica virtual computer volume image 124 is a reference, materializes the file, that is, acquires the entity of the corresponding file from the template virtual computer volume image 122 which is the reference destination. For example, in FIG. 19, the file corresponding to record 1912 with the classification 'user' is a file with different data for each user but which is not split. In addition, the join modification unit 136 updates the classification field 1604 of the record of the corresponding file in the mapping table 129 to entity (step 1202). Thereafter, the join modification unit 136 mounts the replica virtual computer volume image 124 by means of the virtual computer hosting program execution unit 141 and updates the materialized update target file in the replica virtual computer volume image 124 by means of an update file (step 1203). The fact that the file which corresponds to record 1912 is a file with an entity can be seen from record 1613 of the mapping table 129 and the mapping table 129 remains unchanged. Following the replacement, the virtual computer hosting program execution unit 141 replaces the replica virtual computer volume image 124 with the user-specific virtual computer volume image 123, which is a virtual computer volume image deployed specifically for the user, (step 1204) and ends the individual part total update processing (step 1205).

Figure 14:
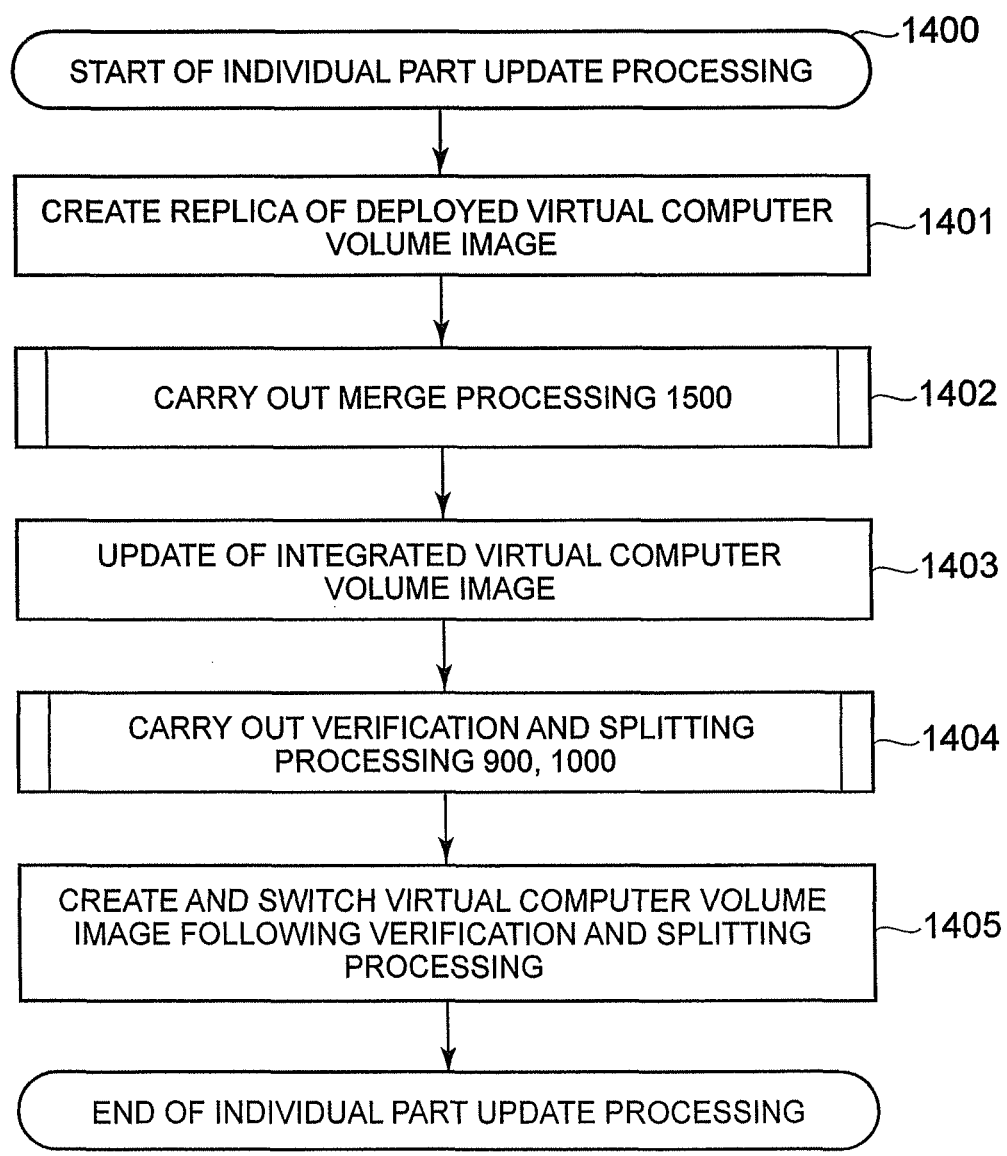
FIG. 14 is a flowchart of split individual part update processing according to an embodiment of the present invention.

FIG. 14 is a flowchart of split individual part update processing according to an embodiment of the present invention. The individual part update processing is update processing in a case where an update target file is a split file.

First, the update processing is started when the join modification unit 136 is started up as a result of the computer system administrator operating the management console 151 (step 1400). The join modification unit 136 creates a replica virtual computer volume image 124 which is a replica of the user-specific virtual computer volume image 123 (step 1401). Thereafter, the join modification unit 136 executes merge processing (See FIG. 15) in order to join (merge) the split files constituting the update target (step 1402) and executes update processing with respect to the joined file (step 1403). Following the update processing, the verification and splitting unit 134 executes verification and splitting processing shown in FIGS. 9 and 10 and executes splitting processing if the file can be split (step 1404). In step 1404, the template virtual computer volume image 122 and user-specific virtual computer volume image 123 are the entry targets instead of the release virtual computer volume image 121 and template virtual computer volume image 122. Following the execution of verification and splitting processing, the join modification unit 136 replaces the replica virtual computer volume image 124 with the user-specific virtual computer volume image 123 provided there are no problems with the replacement (step 1405) and ends the processing. The virtual computer hosting program execution unit 141 subsequently provides the user with services by executing the replaced user-specific virtual computer volume image 123. As a result of the individual part update processing, a file update can be performed without hindrance even when the pre-split file of the split file is the update target.

Figure 15:
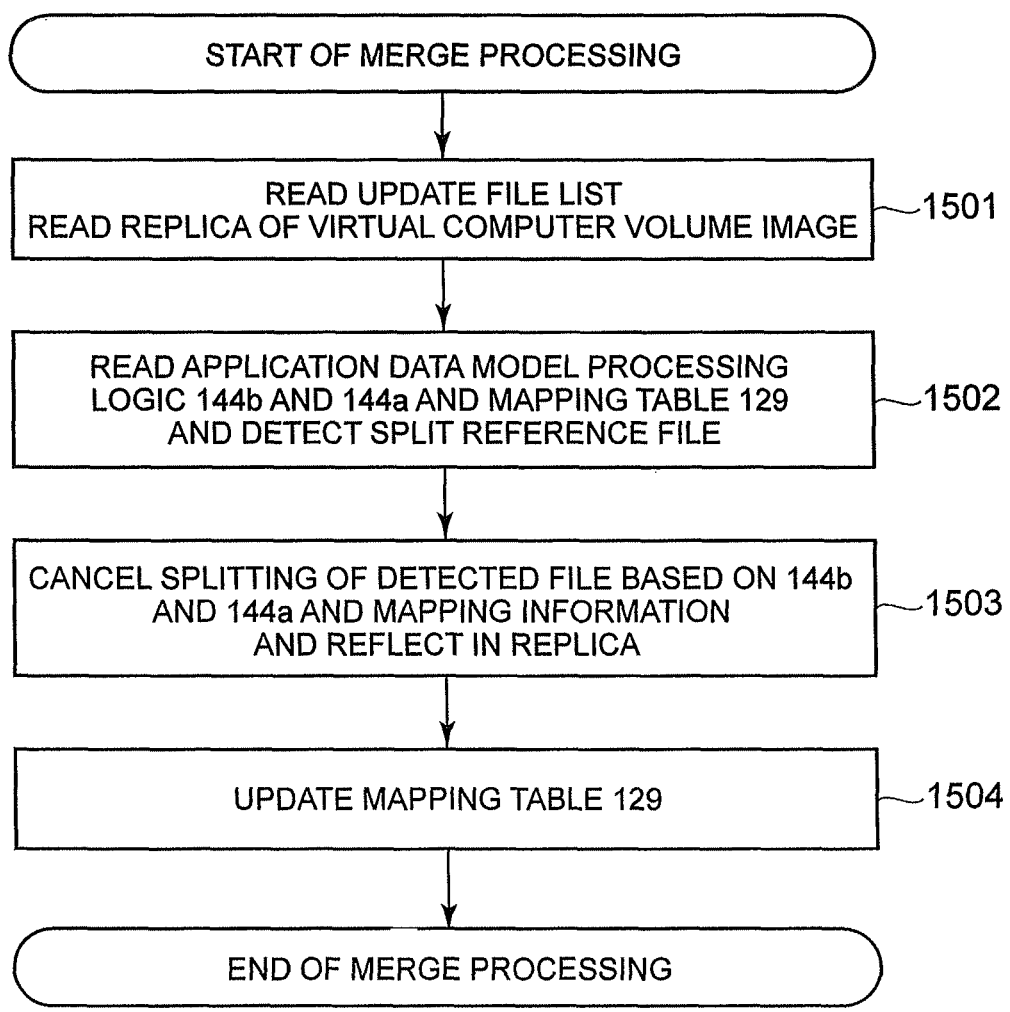
FIG. 15 is a flowchart of merge processing according to an embodiment of the present invention.

FIG. 15 is a flowchart of merge processing according to an embodiment of the present invention.

The join modification unit 136 reads the update file list of the update file list table 146 and the replica virtual computer volume image 124 (step 1501). Thereafter, the join modification unit 136 reads the application data model processing logic 144*a* and 144*b* and the mapping table 129 and detects files set for referencing after being split among the update target files in the update file list (step 1502). For example, the file corresponding to record 1913 of the update file list table 146 is a file which is set for referencing after being split. The join modification unit 136 cancels the splitting of the detected file based on the mapping table 129 and the application data model processing logic 144*a* and application data model processing logic 144*b* and performs file joining (step 1503). For example, in the case of the file corresponding to record 1913, the join modification unit 136 joins the files corresponding to records 1624 and 1625 of the mapping table 129, materializes the file as the file corresponding to record 1623, and reflects the file in the replica virtual computer volume image 124. Thereafter, the join modification unit 136 updates the mapping table 129 on the basis of the result of joining the file (step 1504) and ends the processing. As a result of the merge processing, the split files can be joined to the update target file which has not been split.

When executing the shared part total update processing shown in FIG. 11 above, the shared part individual update processing shown in FIG. 12, and the individual part update processing shown in FIG. 14, for example, the management console 151 may, as a result of the computer system administrator using the management console 151 to designate the update file and the processing to be executed, also execute processing that is executed in accordance with the designation and, as a result of registering the update file, the virtual computer storage management and configuration modification program execution unit 131 may also judge whether any update processing may be executed on the basis of the update file, and execute this processing.

Although the present invention was described hereinabove on the basis of an embodiment, the present invention is not limited to the above embodiments and can be applied in a variety of other forms.

For example, although this embodiment determines the state of a file on the basis of evaluation criteria by storing evaluation criteria which determine the state (entity, split, reference, or the like) of a file for configuring a virtual computer in the evaluation criteria tables 132 and 133 and storing the evaluation criteria and the judgment procedure in a program, the state of a file may be determined by storing the evaluation criteria only in a table and using the table, or the state of a file may be determined by storing a judgment procedure for all of the evaluation criteria in a program and executing the judgment procedure.

Furthermore, although the entity of a file in a predetermined area is referenced with a file determined for referencing as a unit in the above embodiment, the present invention is not limited to this arrangement. A disk image which stores the entities of a corresponding plurality of files may also be referenced with a disk image which includes a plurality of files determined for referencing serving as a unit. Furthermore, although, when one file is split, this one file is split into one file which is stored as an entity and one file which references the entity in the above embodiment, the present invention is not limited to this splitting. There may also be a plurality of files stored as entities and a plurality of files which reference the entities. Moreover, although a file used by an application (program) is split and handling information for dealing with post-split files is modified in this embodiment, the present invention is not limited to this arrangement. For example, a file of a part other than a kernel-related part which is used by the OS (a program) may also be split and the handling information for handling the post-split files may be changed. In short, files used by a variety of programs can be split and the handling information thereof can be modified.

What is claimed is:

1. A storage apparatus, comprising:
   a virtual computer execution unit that executes a virtual server volume image, the virtual server volume image including a plurality of files relating to an operating system or application programs;
   a trace data output unit that outputs trace data relating to accesses to the files during execution of the virtual server volume image, the trace data including an access type, an access address, and an access frequency for each of the files of the plurality of files;
   a judgment unit which judges, for each of the files based on the trace data for the file, whether the file conforms to a first type of file, and, upon judging that the file conforms to the first type of file, judges whether the file conforms to a second type of file, the first type of file having a write access and the second type of file having an area where localized write accesses occur; and
   a splitting unit that splits each of the files conforming to the second type of file into the area where the localized write accesses occur as a first file categorized as an entity and a remaining area of the file as a second file categorized as a reference.

2. The storage apparatus according to claim 1, further comprising:
   a setting unit that, for each of the files, stores an entity of the first file in a disk image for configuring the virtual computer sets the second file to reference an entity of the second file in a predetermined destination storage.

3. The storage apparatus according to claim 1, further comprising:
   a reception unit which receives an update file for updating a pre-split file that is split into the first file and the second file;
   a joining unit which generates a file in which the entities of the first file and the second file are joined; and
   a replacement unit which replaces the joined file with the update file.

4. The storage apparatus according to claim 1, wherein each of the files conforming to the second type of file is a file used by a predetermined program, and wherein the storage apparatus further comprises:
   a handling information acquisition unit which acquires handling information describing the handling of the file by the predetermined program;
   a description modification unit which modifies the handling information so that the handling information corresponds to the first file and the second file; and
   a modified handling information storage unit which stores the modified handling information.

5. A computer system, comprising:
a storage apparatus which modifies the configuration of a file for configuring a plurality of virtual computers respectively; and
a storage device capable of storing data, and
wherein the storage device comprises:
- a disk image storage unit which stores a disk image for storing a file for configuring the respective virtual computers; and
- a template disk image storage unit which stores a virtual server volume image as a template disk image for storing a file constituting a template of the disk image, the virtual server volume image including a plurality of files relating to an operation system or application programs, and wherein the storage apparatus comprises:
- a virtual computer execution unit that executes the virtual server volume image;
- a trace data output unit that outputs trace data relating to accesses to the files during execution of the virtual server volume image, the trace data including an access type, an access address, and an access frequency for each of the files of the plurality of files;
- a judgment unit which judges, for each of the files based on the trace data for the file, whether the file conforms to a first type of file, and, upon judging that the file conforms to the first type of file, judges whether the file conforms to a second type of file, the first type of file having a write access and the second type of file having an area where localized write accesses occur;
- a splitting unit which splits each of the files conforming to the second type of file into the area where the localized write accesses occur as a first file categorized as an entity and a remaining area of the file as a second file categorized as a reference;
- a storage unit that stores the first file and the second file in the template disk image; and
- a setting unit which extracts the entity of the first file from the virtual server volume image and stores the entity in the disk image, and which sets the second file to reference the entity of the corresponding second file in the virtual server volume image.

6. A method for managing a storage apparatus, the method comprising:
executing a virtual server volume image, the virtual server volume image including a plurality of files relating to an operating system or application programs;
outputting trace data relating to accesses to the files during execution of the virtual server volume image, the trace data including an access type, an access address, and an access frequency for each of the files of the plurality of files;
judging, for each of the files based on the trace data for the file, whether the file conforms to a first type of file, and, upon judging that the file conforms to the first type of file, judging whether the file conforms to a second type of file, the first type of file having a write access and the second type of file having an area where localized write accesses occur; and
splitting each of the files conforming to the second type of file into the area where the localized write accesses occur as a first file categorized as an entity and a remaining area of the file as a second file categorized as a reference.

* * * * *